US009053056B2

(12) United States Patent
Yoshida et al.

(10) Patent No.: US 9,053,056 B2
(45) Date of Patent: Jun. 9, 2015

(54) CONTROL APPARATUS, STORAGE SYSTEM, AND MEMORY CONTROLLING METHOD

(75) Inventors: Masahiro Yoshida, Kawasaki (JP); Tadashi Matsumura, Kawasaki (JP); Taichi Ohno, Matsuyama (JP)

(73) Assignee: FUJITSU LIMITED, Kawasaki (JP)

( * ) Notice: Subject to any disclaimer, the term of this patent is extended or adjusted under 35 U.S.C. 154(b) by 1666 days.

(21) Appl. No.: 12/199,295

(22) Filed: Aug. 27, 2008

(65) Prior Publication Data

US 2009/0172679 A1 Jul. 2, 2009

(30) Foreign Application Priority Data

Dec. 27, 2007 (JP) ................................. 2007-336801

(51) Int. Cl.
*G06F 12/12* (2006.01)
*G06F 12/08* (2006.01)

(52) U.S. Cl.
CPC .......... *G06F 12/121* (2013.01); *G06F 12/0862* (2013.01); *G06F 12/0866* (2013.01); *G06F 2212/6024* (2013.01)

(58) Field of Classification Search
CPC ........................... G06F 12/121; G06F 12/0862
USPC .......................................................... 718/102
See application file for complete search history.

(56) References Cited

U.S. PATENT DOCUMENTS

| 5,594,885 A * | 1/1997 | Lautzenheiser ............... 711/133 |
| 6,721,854 B1 | 4/2004 | Asano et al. |
| 7,092,971 B2 | 8/2006 | Idei et al. |

FOREIGN PATENT DOCUMENTS

| JP | 62-130440 | 6/1987 |
| JP | 11-259363 | 9/1999 |
| JP | 2001-125829 | 5/2001 |
| JP | 2001-318902 | 11/2001 |
| JP | 2004-334592 | 11/2004 |
| JP | 2005-258735 | 9/2005 |

OTHER PUBLICATIONS

Hennessy, John. Patterson, David. Computer Architecture: A Quantitative Approach. Morgan Kaufmann Publishers, Inc. Second Edition, 1996. pp. 372-404.*
Japanese Patent Office Action mailed Jan. 5, 2010 for corresponding Japanese Patent Application No. 2007-336801.

* cited by examiner

*Primary Examiner* — Corey S Faherty
(74) *Attorney, Agent, or Firm* — Staas & Halsey LLP

(57) ABSTRACT

In order to more efficiently use a cache memory to realize improved response ability in a storage system, there provided are a cache memory which stores the data read from the storage apparatus, an access monitoring unit which monitors a state of access from the upper apparatus to the data stored in the storage apparatus, a schedule information creating unit which creates schedule information that determines contents to be stored in the cache memory based on the access state, and a memory controlling unit which controls record-processing of the data from the storage apparatus to the cache memory and removal-processing of the data from the cache memory based on the schedule information.

4 Claims, 23 Drawing Sheets

FIG. 3

|        | Access |
|--------|--------|
| Data 1 | 9      |
| Data 2 | 0      |
| Data 3 | 13     |
| :      | :      |

FIG. 4

| Data 1   |        |
|----------|--------|
| Time     | Access |
| 00:00:00 | 9      |
| 00:01:00 | 7      |
| 00:02:00 | 16     |
| :        | :      |

FIG. 5

| Data 1              |           |       |
|---------------------|-----------|-------|
| Time                | Frequency | Count |
| 00:00:00 - 00:29:59 | B         | 265   |
| 00:30:00 - 00:59:59 | B         | 203   |
| 01:00:00 - 01:29:59 | A         | 429   |
| :                   | :         | :     |

FIG. 6

| Data 1 | Present | Today | Renewal |
|---|---|---|---|
| Time | Frequency | Frequency | Frequency |
| 00:00:00 - 00:29:59 | B | A | A |
| 00:30:00 - 00:59:59 | B | A | A |
| 01:00:00 - 01:29:59 | A | B | B |
| 01:30:00 - 01:59:59 | A | C | B |
| 02:00:00 - 02:29:59 | A | C | C |
| : | : | : | : |

FIG. 7

| 2007/6/1 | Data 1 | Data 2 | Data 3 | ... | Data n |
|---|---|---|---|---|---|
| Time | Frequency | Frequency | Frequency | ... | Frequency |
| 00:00:00 - 00:29:59 | B | A | D | ... | C |
| 00:30:00 - 00:59:59 | A | A | D | ... | C |
| 01:00:00 - 01:29:59 | A | B | D | ... | B |
| 01:30:00 - 01:59:59 | A | C | D | ... | A |
| : | : | : | : | ... | : |

FIG. 15

| Data 1 | 2007/6/1 |
|---|---|
| Time | Frequency |
| 00:00:00 - 00:29:59 | A |
| 00:30:00 - 00:59:59 | A |
| 01:00:00 - 01:29:59 | A |
| 01:30:00 - 01:59:59 | B |
| 02:00:00 - 02:29:59 | A |
| : | : |

FIG. 21

| 2007/6/1 00:00:00 - 00:29:59 | |
|---|---|
| Data | Frequency |
| Data 1 | A |
| Data 2 | A |
| Data 5 | A |
| Data 7 | A |
| : | : |

FIG. 24

| 2007/6/1 00:00:00 - 00:29:59 | |
|---|---|
| Data | Frequency |
| Data 3 | 0 |
| Data 8 | 0 |
| Data 11 | 0 |
| Data 13 | 0 |
| : | : |

CONTROL APPARATUS, STORAGE SYSTEM, AND MEMORY CONTROLLING METHOD

BACKGROUND OF THE INVENTION

1) Field of the Invention

The present invention relates to a data storage apparatus (disk array apparatus). In particular, the invention relates to the technology for controlling a cash memory in a control apparatus that performs processing to a storage apparatus in accordance with a processing request from an upper apparatus.

2) Description of the Related Art

With a recent tendency of digitizing various types of data for its use on computers, there exits an increasing importance of data input/output apparatuses (data storage apparatuses) that are capable of efficiently storing a great mount of data with high reliability, independent from host computers executing processing to data.

As such a data storage apparatus, a disk array apparatus, which is formed of a great number of disks (for example, magnetic tapes and optical disks) and a disk controller that controls such a great number of disks, has been used. This disk array apparatus is capable of controlling the great number of disks thereof in response to disk access requests from an upper apparatus (host computer).

Here, FIG. 26 illustrates a construction of a storage system 110 having a previous disk array apparatus 100. The previous storage system 110 is formed of the disk array apparatus 100 and a host (HOST) 111, as an upper apparatus, which issues access requests to the disk array apparatus 100.

The disk array apparatus 100 is formed of a data storage apparatus (DE: Device Enclosure) 101 on which are mounted multiple disks (not illustrated; non-volatile media) storing data therein and a control apparatus (CE: Controller Enclosure) 102 on which are mainly mounted communication modules for communicating with the control apparatus and the host apparatus (host 111).

In this instance, the number of disks mounted on the storage apparatus 101 increases as the construction scale of the disk array apparatus 100 becomes greater.

Here, the control apparatus 102 has more than one (here, two) controller module (CM: Controller Module) 103a and 103b. In the following description, the controller modules will be called "CMs 103" when no distinction is made between the CM 103a and the CM 103b.

Each of the host 111 and the CM 103 are coupled to each other by means of coupling the interfaces 112a through 112d [expressed as "CH" (Channel Interface) in the figure] of the host 111 with the CAs (Channel Adaptors) 104a through 104d, respectively.

Further, the CM 103 is coupled to the DE 101 through DAs (Disk Adapters) 105a through 105d.

Each of the CMs 103a and 103b includes cache memories (expressed as "Memory" in the figure) 106a and 106b, which are volatile media, and two CPUs (Central Processing Units) 107a and 107b, and 108a and 108b. In this instance, in the following description, the cache memories will be called the "cache memories 106" when no distinction is made between the cache memories 106a and 106b, and the CPUs will be called the "CPU 107" and the "CPU 108" when no distinction is made between the CPUs 107a and 107b or between the CPUs 108a and 108b.

Upon generation of a data access (read/write request) from the host 111, the CMs 103 controls the DE 101 in accordance with the request.

When the host 111 sends a data writing request, the CPU 107 and the CPU 108 of the CMs 103 control data write processing of the DE 101 to a disk.

Further, upon issuance of a data reading request from the host 111, the CPU 107 and the CPU 108 of the CMs 103 send the data to the host 111 when the data is present in the cache memories 106. Contrarily, when the data is absent in the cache memories 106, the CPU 107 and the CPU 108 read the data from the DE 101 and sends the data to the host 111.

In this instance, the CPUs 107 and 108 registers the data read from the DE 101 in the cache memories 106. That is, the CPUs 107 and 108 function also as a controller that controls the cache memories 106.

Here, upon accessing (a reading request) from the host 111, when the requested data is present in the cache memories 106 of the CMs 103, the disk array apparatus 100 is capable of responding to the host 111 in high speed.

However, when the request data is not present in the cache memories 106 of the CMs 103, the disk array apparatus 100 must read the data from the DE 101, so that the response speed to the host 111 is decreased.

In addition, recently, the storage capacity of disks (for example, hard disks) of the DE 101 of a disk array apparatus 100 has been increased, and the maximum storage capacity is increased up to the petabyte order. Although the storage capacity of a cache memory 106 has also been increased, it still stays at the gigabyte order, so that it has not utterly reached the storage capacity of the disks of the DE 101.

Hence, in such a disk array apparatus 100, the following methods (1) through (3) have been employed as a method for controlling data to be registered (expanded) in cache memories 106 for the purpose of improving the response ability.

(1) Data is expanded in/removed (released) from cache memories 106 by using the LRU (Least Recently Used) logic.

(2) Data to which accesses are made at a high frequency is resident, or is remained with precedence, in cache memories 106.

(3) In accordance with access requests in the past, data is prior read (obtained) to cache memories 106 (see, for example, the following patent documents 1 through 3).

SUMMARY OF THE INVENTION

The above method (1) is a basic method for controlling cache memories 106. However, this method (1) has a problem that even the data whose final access is the oldest but a later access thereto is probable is removed.

That is, it is preferable that the data whose access interval (cycle) is long but an access thereto is necessarily performed is recorded in cache memories 106. The above method (1), however, has an apprehension of removing such data automatically.

Further, the abovemethod (2) has a problem of causing a difference in response ability among multiple data items due to the limited storage capacity of the cache memories 106 and the frequency and the interval of accessing from the host 111. That is, in spite of the limited capacity of cache memories 106, only a part of data occupies the cache memories 106. As a result, there caused is a problem that the response ability of data that could not be registered in the cache memories 106 is always poor, while the response ability of data registered in the cache memories 106 is fine.

Still further, the above method (3) estimates accessing to data based on access history in the past, and prior reads data in cache memories 106. However, this method also has a problem that it is incapable to support a case where a data access tendency is changed during a time period, from the time at which the estimation is made to the time at which the prior reading is actually executed (for example, in a case where an access cycle is changed and in a case where an access frequency to a predetermined data increase or decreases with respect to the past history) In such a case, there is a possibility that the response ability is inversely deteriorated.

Furthermore, the above methods (2) and (3) pay an attention to how to select the data to be newly registered. However, in order to improve the response ability to the host 111, it is preferable to expand, of all of the data, only the data that is to be expanded with precedence in the cache memories 106. To realize this, it is preferred that data low in precedence with respect to the data recorded only in the DE 101, which data is unnecessary data in the cache memories 106, is positively removed to produce a space capacity in the cache memories 106. However, since the above described methods (1) through (3) are incapable of realizing this, it is considered that there still is room for further improving the response ability by use of the cache memories 106 more efficiently.

[Patent Document 1] Japanese Patent Application Laid-open No. 2001-318902

[Patent Document 2] Japanese Patent Application Laid-open No. 2001-125829

[Patent Document 3] Japanese Patent Application Laid-open No. 2005-258735

With the foregoing problems in view, it is an object of the present invention to make it possible to improve response ability by using cache memories more efficiently.

In order to accomplish the above object, according to the present invention, as a generic feature, there provided is a control apparatus, coupled to a storage apparatus for storing data therein and an upper apparatus for processing the data, for controlling read-processing of the data stored in the storage apparatus in response to a request from the upper apparatus, the control apparatus comprising: a cache memory which stores the data read from the storage apparatus; an access monitoring unit which monitors a state of access from the upper apparatus to the data stored in the storage apparatus; a schedule information creating unit which creates schedule information that determines contents to be stored in the cache memory based on the access state monitored by the access monitoring unit; and a memory controlling unit which controls record-processing of the data from the storage apparatus to the cache memory and removal-processing of the data from the cache memory based on the schedule information.

As a preferred feature, the schedule information creating unit creates precedence information, which indicates precedence with which the data to be recorded in the cache memory is recorded, in each predetermined time period as the schedule information for each of a plurality of items of data stored in the storage apparatus, and the memory control unit controls the record-processing and the removal-processing based on the precedence information.

As another generic feature, there provided is a control apparatus, coupled to a storage apparatus for storing data therein and an upper apparatus for processing the data, for controlling read-processing of the data stored in the storage apparatus in response to a request from the upper apparatus, the control apparatus comprising: the above cache memory; the above access monitoring unit; the above schedule information creating unit; a correcting unit which corrects the schedule information in accordance with the immediately preceding access state before the time period relating to the scheduling information; and a memory controlling unit which controls record-processing of the data from the storage apparatus to the cache memory based on the schedule information corrected by the correcting unit.

As yet another generic feature, there provided is a storage system, comprising: at least one storage apparatus for storing data therein; and the above control apparatus.

As still another generic feature, there provided is a memory controlling method for use in control of a cache memory, which stores the data read from the storage apparatus, of a control apparatus, coupled to a storage apparatus for storing data therein and an upper apparatus for processing the data, for controlling read-processing of the data stored in the storage apparatus in response to a request from the upper apparatus, the method comprising the steps of: (a) monitoring a state of access from the upper apparatus to the data stored in the storage apparatus; (b) creating schedule information that determines contents to be stored in the cache memory based on the access state monitored in the step (a); and (c) controlling record-processing of the data from the storage apparatus to the cache memory and removal-processing of the data from the cache memory based on the schedule information.

The control apparatus, the storage system, and the memory control method of the present invention guarantee the following advantageous results.

According to the control apparatus, the storage system, and the memory control method, since there provided are an access monitoring unit (access monitoring step) which monitors a state of access from the upper apparatus to the data stored in the storage apparatus; a schedule information creating unit (schedule information creating step) which creates schedule information that determines contents to be stored in the cache memory based on the access state; and a memory controlling unit (memory controlling step) which controls record-processing of the data from the storage apparatus to the cache memory and removal-processing of the data from the cache memory based on the schedule information. With this arrangement, it is possible to record data, to which an access is expected to be made from the upper apparatus, in line with an access state. Further, it is possible to positively remove data, no access thereto from the upper apparatus is expected, from the cache memories in line with the access state. Accordingly, it is possible to allocate the area from which data has been removed to another data item whose access frequency is high or for recording of data not included in the scheduling information. As a result, more effective use of the cache memories becomes available, the response ability to the upper apparatus being thereby improved.

Further, the schedule information creating unit creates precedence information, which indicates precedence with which the data to be recorded in the cache memories is recorded, in each predetermined time period as the schedule information for each of the more than one data item stored in the storage apparatus, and the memory control unit controls the record-processing and the removal-processing based on the precedence information. As a result, an efficient use of the cache memories with reliability based on the access frequency is realized, so that the response ability to the upper apparatus is improved with reliability. That is, it is possible to provide a construction which realizes reading of data high in access probability with reliability under a state where the capacity of the cache memories is limited.

Still further, there provided is a corrector, which corrects the precedence information in accordance with the immediately preceding access state at the time of controlling the record processing and the removal processing based on the schedule information, so that even when an access state is changed between the time of creation of schedule information in accordance with the access state at that time and the time of actual start of the processing based on the schedule information, it is still possible to control the contents stored in the cache memories based on the schedule information supporting the change in the access state. As a result, it is possible to control the cache memories more efficiently and to improve the response ability to the upper apparatus with higher reliability.

Other objects and further features of the present invention will be apparent from the following detailed description when read in conjunction with the accompanying drawings.

BRIEF DESCRIPTION OF THE DRAWINGS

FIG. 3 is a table showing an example of the number of times of read accesses collected by an access information collection controller in the CM according to one preferred embodiment of the present invention;

FIG. 4 is a table showing an example of access history which is grouped for each data item by an access monitoring/history managing unit of a cache memory controller in the CM of the storage system according to one preferred embodiment of the present invention;

FIG. 5 is a table showing an example of an access state grouped for each data item by an access monitoring/history managing unit of the cache memory controller in the CM of the storage system according to one preferred embodiment of the present invention;

FIG. 6 is a table showing an example of schedule information created by a schedule managing/updating unit of the cache memory controller in the CM of the storage system according to one preferred embodiment of the present invention;

FIG. 7 is a table showing an example of schedule information sent by a schedule controller of the cache memory controller in the CM of the storage system according to one preferred embodiment of the present invention;

FIG. 15 is a table showing schedule information set by a user in the storage system according to one preferred embodiment of the present invention;

FIG. 21 is a table showing an example of a data expansion list created by a list creator of the cache memory controller in the CM of the storage system according to one preferred embodiment of the present invention;

FIG. 24 is a diagram showing an example of a data release list created by the list creator of the cache memory controller in the CM of the storage system according to one preferred embodiment of the present invention;

DESCRIPTION OF THE PREFERRED EMBODIMENT(S)

Referring to the relevant drawings, a description will be made hereinafter of one preferred embodiment of the present invention.

[1] One Preferred Embodiment

[a] Construction of Storage System 1 According to One Preferred Embodiment of the Present Invention First of all, referring to FIG. 1, a description will be made of a construction of a storage system (hereinafter, will be called "the present storage system") 1 according to one preferred embodiment of the present invention.

Figure 1:
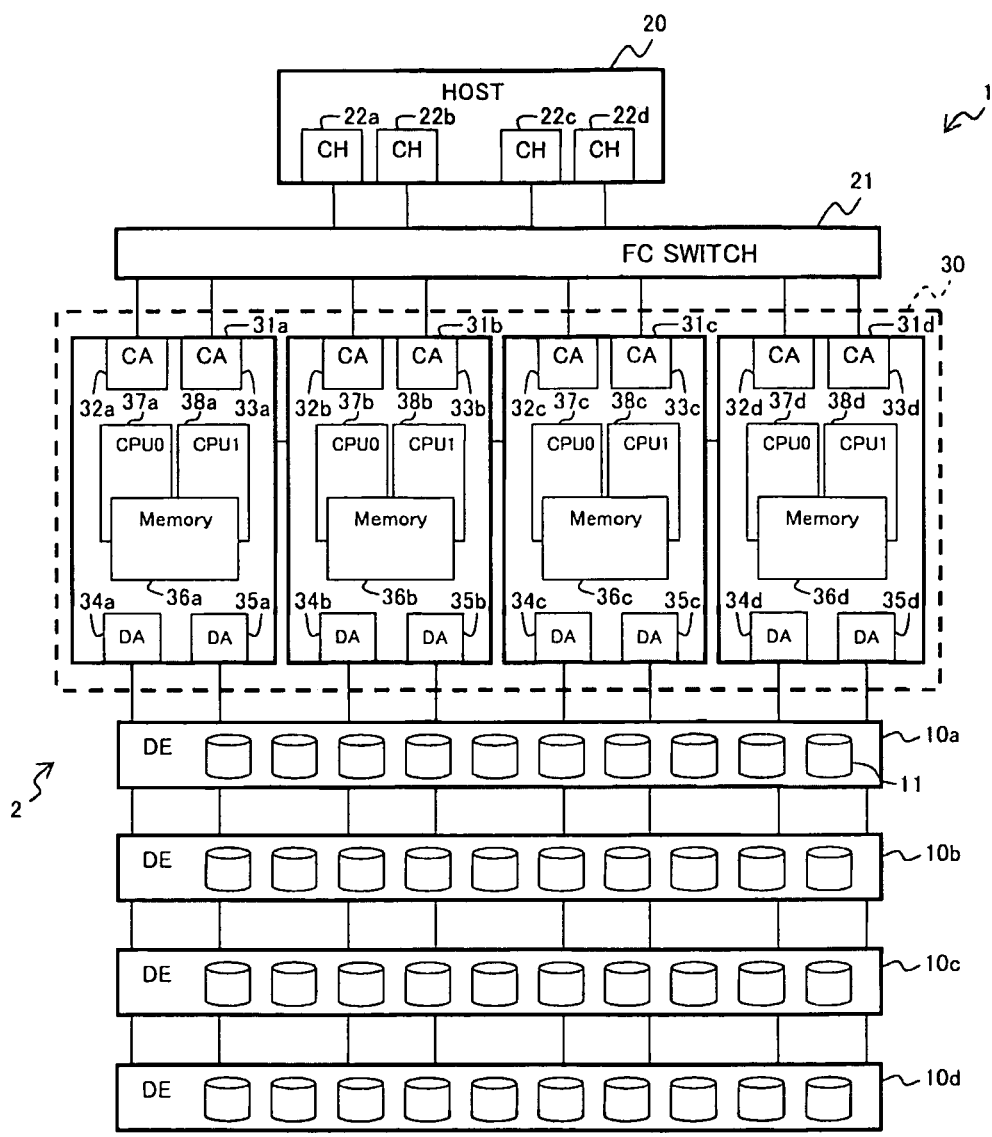
FIG. 1 is a block diagram showing a construction of a storage system according to one preferred embodiment of the present invention.

As shown in FIG. 1, the present storage system 1 includes: DEs (Device Enclosures: storage apparatuses 10a) through 10d; a host (expressed as "HOST" in the figure; upper apparatus) 20; an FC (Fiber Channel) switch 21; and a CE (Controller Enclosure: control apparatus) 30.

The DEs 10a through 10d (hereinafter, will be called "DE 10" in cases where no distinction is made there among), and the CE 30 functions as a disk array apparatus 2.

In this instance, the reference character "11" indicating disks is added only to the right top most one in the figure for simplification of the figure, but all the blocks having a column shape in the DE 10a through 10d are similar disks 11.

Each of the DEs 10 has multiple (here, ten) disks 11 and stores multiple data items (volumes) which are subjects of processing performed by the host 20.

The host 20 takes data stored in the DE 10 as a processing subject, and sends a data access request (read/write request) to the CE 30 through an FC switch 21.

The CE 30, which is coupled to the DEs 10 and the host 20, controls read processing (read-processing) of data stored in the DEs 10 and write processing of data to the DEs 10 in response to a processing request (read/write request from the host 20). Here, the CE 30 has four CMs (Controller Modules) 31a through 31d.

Each of the CMs 31a through 31d (hereinafter, will be called "CM 31" in cases where no distinction is made there among) includes: CAs (Channel Adapters) 32a through 32d and 33a through 33d (hereinafter, will be called CA 32 and CA 33 in cases where no distinction is made there among), respectively; DAs (Disk Adapters) 34a through 34d and 35a through 35d (hereinafter, will be called DA 34 and DA 35 in cases no distinction is made thereamong), respectively; cache memories (expressed as "Memory" in the figure) 36a through 36d (hereinafter, will be called "cache memory 36" in cases where no distinction is made thereamong), respectively; and CPUs (Central Processing Units; expressed as "CPU 0" and "CPU 1" in the figure) 37a through 37d and 38a through 38d (hereinafter, will be called CPUs 37 and 38 in cases where no distinction is made thereamong), respectively.

Here, a description will be made of a connection state among apparatuses 10, 20, and 30. The host 20 and the CE 30 are coupled to each other through the FC switch 21.

The host 20 is coupled to the FC switch 21 through CHs 22a through 22d, and the CE 30 is coupled to the FC switch 21 through the CAs 32 and 33 of each CM 31.

Further, the CE 30 is coupled to each DE 10 through the DAs 34 and 35 of each CM 31.

For example, each CM 31 is coupled to the disks 11 under its charge through the DAs 34 and 35, and a construction is given such that accessing to all the disks 11 of the DE 10a through 10d is realized by all the CMs 31a through 31d.

In addition, the CMs 31a through 31d are constructed to be able to communicate with one another.

In the CM 31, upon reception of a write request as data access from the host 20, the CPUs 37 and 38 control data write processing of the DEs 10 to the disks 11.

Further, in response to a read request of data from the host 20, the CPUs 37 and 38 send the data to the host 20 when the data is present in the cache memory 36, while they read the data from the disks 11 of the DE 10 and then send the data to the host 20 when the data is absent in the cache memory 36.

The cache memory 36 of the CM 31 hold the data read from the DE 10; the CPUs 37 and 38 records (expands) the read-out data in the cache memory 36.

That is, the CPUs 37 and 38 function as a controller (control unit) that controls the cache memory 36.

Further, the data held in a cache memory 36 is duplicated by another cache memory 36, thereby being made to be redundant in preparation to any disorder or the like.

More precisely, data (that is, cache data relating to the disk 11) in an area (use area) that can hold data recorded in the disk 11 under the CM 31a's charge (connected thereto) is recorded also in an area for duplicating (duplex area) in the cache memory 36b. In this instance, record processing (record-processing) of this data is realized by communication processing between the CMs 31a and 31b performed by the CPUs 37a, 37b, 38a, and 38b.

Likewise, data in a use area in the cache memory 36b is recorded in the duplex area of the cache memory 36c; data in a use area in the cache memory 36c is recorded in the duplex area of the cache memory 36d; and data in a use area in the cache memory 36d is recorded in the duplex area of the cache memory 36a.

Figure 2:
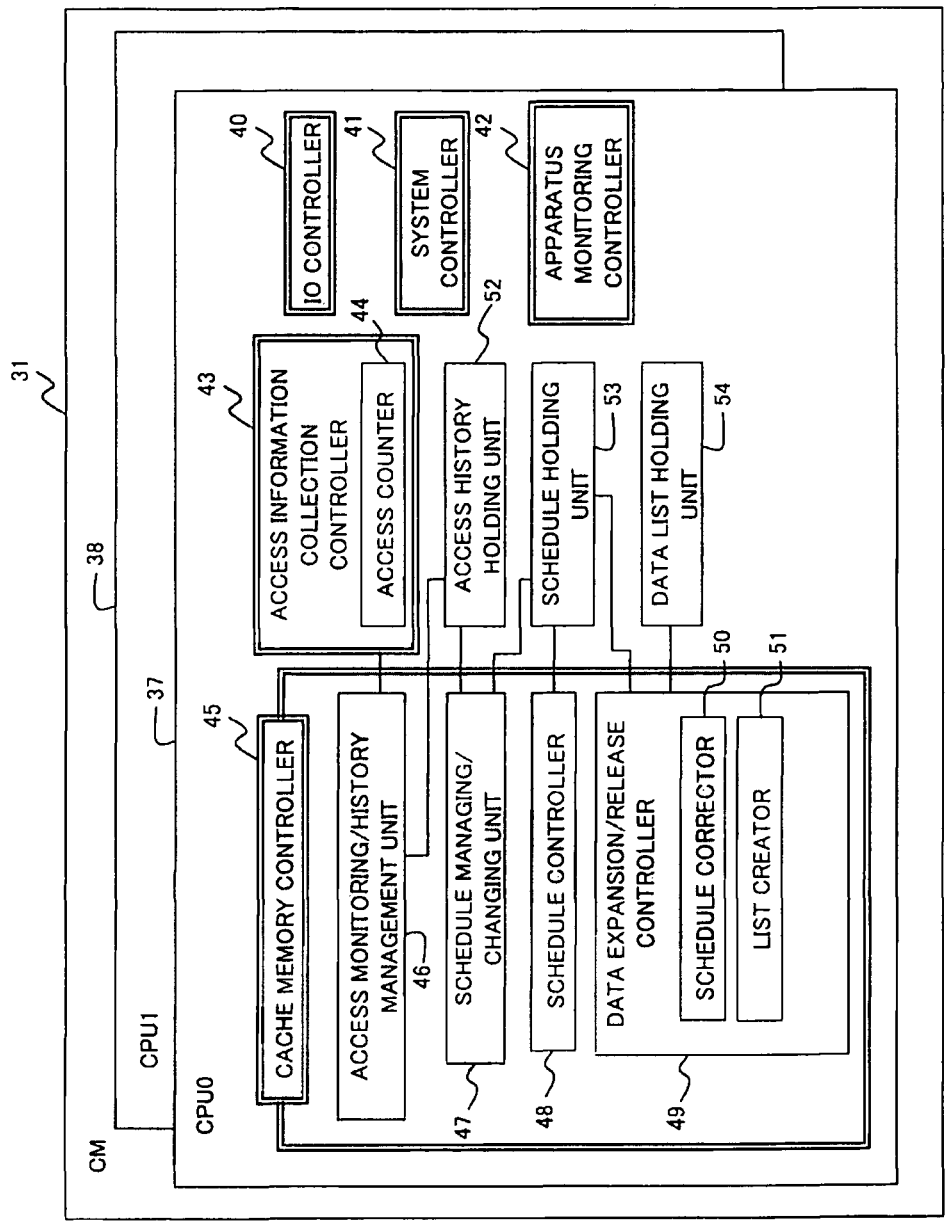
FIG. 2 is a block diagram showing a construction of a CPU of a CM of a CE of the storage system according to one preferred embodiment of the present invention.

Next, referring to FIG. 2, a detailed description will be made of a function construction of the CPUs 37 and 38 of the CM 31. In this instance, since the CPUs 37 and 38 have the same construction, FIG. 2 illustrates a function construction block only in the CPU 37 for simplification of illustration of the figure.

The CPUs 37 and 38 include: an IO (Input/Output) controller 40; a system controller 41; an apparatus monitoring controller 42; an access information collection controller 43; a cache memory controller 45; an access history holding unit 52; a schedule holding unit 53; and a data list holding unit 54.

The IO controller 40 controls a processing request (I/O; Input/Output) from the host 20 and controls data write processing and data read processing to/from the DE 10.

In this instance, the cache memory controller 45 records data read from the DE 10 by the IO controller 40 in the cache memory 36.

The system controller 41 controls each apparatus, and executes, for example, power control of each apparatus.

The apparatus monitoring controller 42 monitors an operation state of each apparatus (whether or not it is in operation) and a power state of each apparatus.

The access information collection controller 43 has an access counter 44 and controls collection of access information about access (the number of times of accesses) from the host 20 to each data item in the DE 10 based on a processing request from the host 20.

In this instance, the access information collection controller 43 cooperates with the IO controller 40 to collect the number of times of accesses from the host 20 to each data item.

The access counter 44 counts the number of times of accesses (read accesses) from the host 20 to each data time held in the DE 10.

As shown in FIG. 3, the access information collection controller 43 obtains the number of times of read accesses from the host 20 for whole the data in the DE 10. In this instance, FIG. 3 shows the number of times of accesses only to Data 1 through Data 3 for simplification of illustration in the figure.

The cache memory controller 45 controls the contents stored in the cache memory 36, and includes: an access monitoring/history manager 46; a schedule managing/updating unit 47; a schedule controller 48; and a data expansion/release controller 49.

The access monitoring/history manager 46 is a controller which summarizes the number of times of accesses obtained by the access information collection controller 43 for each data item for a predetermined time period, and manages access history of each data item as an access state.

Concretely, the access monitoring/history manager 46 obtains and stores the number of times of accesses, which is obtained by the access information collection controller 43 at fixed time intervals, in the access history holding unit 52.

For example, as shown in FIG. 4, the access monitoring/ history manager 46 obtains the number of times of accesses obtained by the access information collection controller 43 at every minute, and summarizes the number of times of accesses (the number of times of read accesses) at every minute for each data item (here, Data 1), and stores the information in the access history holding unit 52.

Further, as shown in FIG. 5, the access monitoring/history manager 46 aggregates the number of times of accesses at every minute once having been stored in the access history holding unit 52 at every predetermined time period (here, at a time period of 30 minutes from 0 o'clock) and for each data item. The access monitoring/history manager 46 allocates access frequency information (here, "A through D"; precedence information) at every aggregation time period and manages and holds the information as an access state.

In this instance, although FIG. 5 shows only Data 1, the access monitoring/history manager 46 actually creates the access state shown in FIG. 5 for all the data in the DE 10 or for all the data in the DE 10 access history is obtained, and stores the access state in the access history holding unit 52.

Here, as to an access frequency (in the figure, "Frequency"; Operational Rank), it is the highest when the rank is A, and it lowers in the order of rank B, C, and D, and the frequency is the lowest when the rank is D. For example, when the access frequency in a predetermined time period is from 0 to 10 times, the access monitoring/history manager 46 determines the access frequency as rank D. When the access frequency is from 11 through 50 times, the access monitoring/history manager 46 determines the access frequency as rank C. When the access frequency is from 51 through 200 times, the access monitoring/history manager 46 determines the access frequency as rank B. When the access frequency is not smaller than 200 times, the access monitoring/history manager 46 determines the access frequency as rank A.

In this instance, the number of times of access collected by the access information collection controller 43 (see FIG. 3) can also be held in the access history holding unit 52.

In this manner, the access information collection controller 43 and the access monitoring/history manager 46 function as an access monitoring unit that monitors the state of access from the host 20 to data recorded in the DE 10.

The schedule managing/updating unit 47 implements schedule management and changing of data expansion to the cache memory 36 for improving an access response (response ability) to the host 20, and creates an optimized schedule from the access state (access history) created by the access monitoring/history manager 46.

Concretely, the schedule managing/updating unit 47 creates schedule information (data expansion schedule) for determining the contents expanded in the cache memory 36 every day or every half a day based on the access state as shown in FIG. 6 (see FIG. 5; history information of access frequency) created by the access monitoring/history manager 46.

As shown in FIG. 6, the schedule managing/updating unit 47 creates such schedule information for each data item. In this instance, though FIG. 6 shows the schedule information of Data 1, the schedule managing/updating unit 47 creates schedule information for all the data items in the DE 11.

In FIG. 6, "Present" indicates schedule information or history in the same time period in the past; "Today" indicates the current schedule information held in the schedule holding unit 53; "Renewal" indicates schedule information for updating, which is created by the schedule managing/updating unit 47. Further, "Time" is present from 0 o'clock to 12 o'clock in a case where schedule information is for half a day, and from 0 o'clock to 24 o'clock in a case where schedule information is for one whole day. In each case, precedence for a time period of 30 minutes is set.

The schedule managing/updating unit 47 creates the schedule information for updating based on access history or the like (for example, access history for a predetermined immediately preceding time period).

Further, the schedule managing/updating unit 47 adjusts the schedule information for updating based on access history in the past and/or the schedule information set by a user.

For example, in a case where schedule information for updating is to be created on Jun. 1, 2007, Friday, the schedule managing/updating unit 47 changes the schedule information for updating which is created based on immediately preceding history information, from history information of the firsts of several months therefore, history information of Fridays of every first week of several months therefore, history information of Fridays therefore, and history information of the first of June in the previous year.

As already described, the schedule managing/updating unit 47 creates precedence information indicating precedence (ranks A through D) to be recorded in the cache memory 36 at predetermined time periods as schedule information for each data item recorded in the DE 10.

Here, the ranks A through D, as precedence, are similar to the access frequency, and A through D, as the frequency in access history, indicate the number of times of accesses. On the other hand, the ranks A through D each in schedule information indicate the precedence with which data is to be recorded in the cache memory 36. Rank A indicates that the data is to always (necessarily) be expanded (expansion high-precedence mode); rank B indicates that the data is to be expanded as much as possible (expansion precedence mode); rank C indicates that the data is to be expanded when space exists in the cache memory 36 (expansion possible mode); rank D indicates that the data is to be removed from the cache memory 36 (expansion suppression mode).

Further, the schedule managing/updating unit 47 creates the precedence information based on not only the access state and the schedule information in the past but also the access state and schedule information having been set by a user beforehand.

In this instance, the method for creating the schedule information by the schedule managing/updating unit 47 will be detailed later with reference to FIG. 12 through FIG. 15.

The schedule controller 48 controls expansion/release (recording/removing) of data to the cache memory 36 based on the schedule information created by the schedule managing/updating unit 47, and implements a request to the data expansion/release controller 49 for expansion/release control of subject data to the cache memory 36.

For example, when the schedule information is obtained every half a day, the schedule controller 48 sends schedule information to the data expansion/release controller 49 before the schedule of every half a day is started (for example, before 0 o'clock in the example shown in FIG. 6), and requests the data expansion/release controller 49 for expansion/release processing.

At that time, as shown in FIG. 7, the schedule controller 48 sends schedule information to the data expansion/release controller 49 as one organized piece of precedence information for each data item (here, for "Data 1" through "Data n") in every predetermined time period.

In this manner, the schedule managing/updating unit 47 and the schedule controller 48 function as a schedule information creating unit which creates schedule information that determines the contents stored in the cache memory 36, based on an access state monitored by the access information collection controller 43 and the access monitoring/history manager 46, which operate as an access monitoring unit.

The data expansion/release controller 49 functions as a memory controlling unit which controls data expansion processing to the cache memory 36 and data release processing from the cache memory 36 based on the schedule information received from the schedule controller 48. The data expansion/release controller 49 evaluates whether or not it should prior read subject data in the DE 10 in accordance with the schedule information and expand it in the cache memory 36 paying a consideration to the capacity of the cache memory 36 and the current operation state, thereby implementing optimal control of the contents stored in the cache memory 36.

That is, when the data expansion/release controller 49 controls expansion processing, it makes the IO controller 40 perform read processing (prior reading) of the data. In a case of accessing for performing release processing, the data is removed from the cache memory 36.

Here, an overview of processing by the data expansion/release controller 49 will be given. In a case of the scheduling information of FIG. 7, since Dada 3 is on rank D in precedence, so that it is expected that no access is made thereto, the data expansion/release controller 49 does not expand the data in the cache memory 36. In this case, when Data 3 is present in the cache memory 36 at the time of processing based on the present schedule information is performed, the data expansion/release controller 49 positively removes Data 3 from the cache memory 36, thereby releasing the memory area in which Data 3 was stored.

Further, as to Data 2, an access thereto is expected at the time of start of processing based on the present schedule information, but it exhibits an access-decreasing tendency. In contrast, Data n is low in possibility of access thereto, but it exhibits an access-increasing tendency. As to Data 1, it is expected that constant accesses are equally made thereto.

On the basis of such tendencies, the data expansion/release controller 49 always expands Data 1, and does not expand Data 2 after "01:30:00", and expands Data n after "00:01100".

Further, at the time of data expansion, it is necessary for considering the size (capacity) of the cache memory 36. That is, when the total size of data to be expanded (data of precedence A and B) is larger than the size of the cache memory 36, the data expansion/release controller 49 executes expansion processing in increasing order of precedence, beginning from the data of precedence A.

Furthermore, as described above, the data expansion/release controller 49 controls release processing for the cache memory 36 also based on schedule information. Basically, in a case where data to be removed based on the schedule information is still remained in the cache memory 36 after completion of record processing (expansion processing), the data expansion/release controller 49 performs control such that removal processing (removal-processing) (release processing) of the remaining data is executed to release the area used by the data.

That is, the data expansion/release controller 49 not only removes data on the cache memory 36 for newly recording data in the cache memory 36 based on the schedule information but also executes thereafter removal processing of data which is preferred to be removed to release a memory area of the cache memory 36 based on the schedule information, even after completion of recording of all the data to be recorded. In this manner, by means of positively releasing an area on the cache memory 36, it becomes possible to allocate the released area to another data item whose access frequency is high and to unexpected data not included in the scheduling information. As a result, more effective use of the cache memory 36 is realized, the response ability to the host 20 being thereby improved.

Further, at the time of the above described processing, the data expansion/release controller 49 corrects the schedule information in accordance with the state of access to the immediately preceding data before executing the processing. For this purpose, the data expansion/release controller 49 has a schedule corrector 50 and a list creator 51.

The schedule corrector 50 corrects the schedule information in accordance with the immediately preceding access state at the time of controlling expansion/release processing performed based on the schedule information (precedence information).

More precisely, the schedule corrector 50 corrects the schedule information in such a manner that the precedence of the data is heightened in a case of an access increasing tendency being exhibited while the precedence of the data is lowered in a case of access decreasing tendency being exhibited, based on the immediately preceding access state, i.e., an access increasing/decreasing tendency to data in a predetermined time period.

As a result, the data expansion/release controller 49 actually controls expansion/release processing based on the schedule information corrected by the schedule corrector 50.

The list creator 51 creates a list of data to be expanded on or to be removed from the cache memory 36 in the time period based on the schedule information corrected by the schedule corrector 50. This list is approximately similar to that shown in FIG. 7 and is formed of the precedence of Data 1 through Data n in each time period, which precedence has been corrected by the schedule corrector 50.

In this instance, an operation of the data expansion/release controller 49 (the schedule corrector 50 and the list creator 51) will be more concretely described later with reference to FIG. 16 through FIG. 25.

Further, the access information collection controller 43 and the cache memory controller 45 are provided for the CPUs 37 and 38 in all of the CMs 31. The access information collection controller 43 of each CM 31 communicates with other CMs 31 to collect and summarize the number of times of accesses relating to data of the DE 10 under the CM 31's charge, which number of times of accesses are collected by such other access information collection controller 43. Then, in each CM 31, the cache memory controller 45 creates schedule information (see FIG. 7) relating to the data under its charge.

According to the present invention, however, anyone of the CM 31 can representatively create schedule information relating to all the data in the DE 10 and notifies the other CMs 31 of the thus created schedule information. In this case, the number of times of accesses to all the data is collected in the access information collection controller 43 of that single CM 31 by the access information collection controller 43.

Then, the cache memory controller 45 of the representative CM 31 creates schedule information, which is sent to the other CMs 31. In this instance, data expansion/release processing performed based on the schedule information sent from the representative CM 31 is executed by the data expansion/release controller 49 in each CM 31.

Further, according to the present storage system 1, when data expansion/release processing performed by the data expansion/release controller 49 based on the schedule information is completed with in a time period of 30 minutes, which is a predetermined time period relating to the schedule information, the cache memory controller 45 performs LRU control during the remaining time period. This makes it possible to use the cache memory 36 efficiently as much as possible even after completion of the control based on the schedule information.

Further, according to the present storage system 1, upon receiving a read request of data not contained in schedule information from the host 20, the cache memory controller 45 performs LRU control to the data.

Furthermore, according to the present storage system 1, a part of the memory area of the cache memory 36 of the CM 31 is made to be a subject area of the processing, based on the schedule information by the cache memory controller 45, and the remaining part is subjected to LRU control as having been previously performed.

That is, the cache memory 36 is divided into two areas: an area controlled by the cache memory controller 45 based on schedule information; and an area controlled based on LRU. In this case, it never happens that the same data is recorded in the above two areas in duplication.

In this instance, the present invention should by no means be limited to the above described construction. Whole the area of the cache memory 36 can be controlled by the cache memory controller 45 based on schedule information. In this case, upon reception of a reading request of data which is not contained in schedule information and thus not present on the cache memory 36 from the host 20, the cache memory controller 45 controls the data based on the schedule information or LRU.

That is, in a case where an area for expanding data not included in the schedule information is not available, the data expansion/release controller 49 of the cache memory controller 45 may allocate such an area by means of removing data low in precedent which has not yet been removed from the cache memory 36 in the schedule information or may allocate such an area based on LRU. With this construction, even when a data read request for data other than that of the schedule information is issued, it is still possible to execute control of the cache memory 36 in response to the request with high reliability.

[b] Operation Procedures of Storage System 1 According to One Preferred Embodiment of the Present Invention Here, referring to the flowchart (step S1 through S12, X1, and Y1) shown in FIG. 8, a description will be made of operation procedures of the present storage system 1 (the memory control method according to one preferred embodiment of the present invention).

First of all, the cache memory controller 45 performs access effective operation check (step S1). This processing is for checking whether or not the cache memory controller 45 will perform control based on the above described schedule information. The CE 30 (for example, each CM 31) is operable to set whether or not the processing performed by the cache memory controller 45 based on the schedule information will be executed, that is, whether or not the access effective operation is to be performed. The processing in step S1 checks such a setting state.

Here, if it is not in an operation state (NO route of step S2), the cache memory controller 45 ends processing without performing anything. Contrarily, if it is in an operation state, (YES route of step S2), the cache memory controller 45 starts an access effective operation (step S3).

In the beginning, the access monitoring/history manager 46 requests the access information collection controller 43 for collection of access information to subject data, thereby making the access information collection controller 43 start access information collection (step S4). After that, processing in the following steps S5 through S12 is executed.

Here, in FIG. 8, the block [described as "loop start (at fixed time intervals)"] indicated by the reference character "X1" immediately below step S4 and the block indicated by "Y1" (described as "loop back") show a fact that the processing in steps S5 through S11 between these blocks X1 and Y1 is executed at predetermined time intervals (for example, every half a day or every day) The processing in steps S5 through S11 keeps being executed at predetermined time intervals as far as the step 11, which will be described later, decides that an operation has not yet ended. In this instance, in FIG. 9 through FIG. 14, FIG. 16 through FIG. 20, FIG. 22, FIG. 24, and FIG. 25, which will be described later, the blocks X2 through X26 and the blocks Y2 through Y26, having the same shapes as those of the block X1 and Y1, indicate a fact that the processing (steps) between these blocks is kept being executed until a predetermined condition is satisfied.

Then, the access monitoring/history manager 46 collects access information collected by the access information collection controller 43 in the above described step S4 (step S5), and performs history management for organizing the access information collected by the access monitoring/history manager 46 as information (see FIG. 5) indicating an access state at predetermined time intervals (step S6).

In this instance, the above described steps S4 through S6 function as an access monitoring step in which a state of access from the host 20 to data stored in the DE 10 is monitored.

Next, the schedule managing/updating unit 47 performs schedule management processing for creating (or updating) such schedule information as shown in FIG. 6 based on an access state managed by the access monitoring/history manager 46 in the above described step S6 (step S7).

Further, the schedule managing/updating unit 47 performs schedule adjustment processing for executing optimization processing between the schedule information managed in the above described step S7 and the schedule information set by a user or the corresponding schedule information in the past (step S8).

In this instance, the above described steps S7 and S8 function as a schedule information creating step for creating schedule information which determines the contents stored in the cache memory 36 based on the access state monitored in the access monitoring step.

Subsequently, the data expansion/release controller 49 performs data expansion/release processing on the cache memory 36 based on the schedule information received from the schedule controller 48 optimized by the schedule managing/updating unit 47 in the above described step S8 (step S9).

In this instance, this step S9 functions as a cache memory control step for controlling data record process from the DE 10 to the cache memory 36 and data removal processing from the cache memory 36.

Here, the cache memory controller 45 checks whether or not the access effective operation has been completed (step S10). If the operation has not yet been completed (NO route of step S11), processing by the cache memory controller 45 is looped back from block Y1 to block X1 in FIG. 8.

Contrarily, if the operation has already been completed (YES route of step S11), the cache memory controller 45 halts the access effective operation (step S12), and ends the processing.

[c] Details of Each Processing by Cache Memory Controller 45

Next, referring to FIG. 8, a detailed description will be made of the above described processing performed in steps S4 through S9 of FIG. 8.

[c-1] Access Information Collection Activation Processing by Access Monitoring/History Manager 46

First of all, referring to the flowchart (steps S4a through S4h, X2, and Y2) of FIG. 9, a detailed description will be made of access information collection activation processing (processing in the above described step S4 in FIG. 8) performed by the access monitoring/history manager 46.

When the access monitoring/history manager 46 starts the access information collection activation processing (step S4a), the access monitoring/history manager 46 checks subject data whose access data is to be collected (step S4b).

Here, in FIG. 9, the block indicated by the reference character "X2" immediately below step S4b [described as "loop start (for the number of subject data items)"] and the block indicated by the reference character "Y2" (described as "loop back") show a fact that the processing in steps S4c through S4g between these blocks X2 and Y2 are executed for the number of subject data items. The processing in steps S4c through S4g are kept being performed until step S4g, which will be described later, determines that no data item is remained (until passing through YES route of step S4g). In this instance, the number of subject data items means all the data in the DE 10.

After that, the access monitoring/history manager 46 performs a state check, checking whether or not the mounting state, the operation state, and the power state, of the DE 10 and the disks 11 relating to the subject data are normal (step S4c).

Here, when the access monitoring/history manager 46 decides that the state of apparatuses is abnormal [any disk 11 is discharged from the DE 10, or the operation state is abnormal (disorder), or the power is turned off] (NO route of step S4d), the processing in step S4e, which will be described later, is skipped.

Contrarily, when the access monitoring/history manager 46 decides that the states of the disks 11 and the DE 10 are normal (YES route of step S4d), it instructs the access information collection controller 43 to activate collection processing of access information to the data (step S4e).

In this instance, upon reception of an access information collection instruction from the access monitoring/history manager 46, the access information collection controller 43 collects access history of the data.

Then, the access monitoring/history manager 46 checks whether or not any subject data remains (remaining subject check) (step S4f). When the remaining subject data is present (NO route of step S4g), the access monitoring/history manager 46 loops back to the processing in the above described step S4c (see box Y2).

Contrarily, when the remaining subject data is absent (YES route of step S4g), the access monitoring/history manager 46 ends the access information collection activation processing (step S4h) and the processing end.

[c-2] Access Information Collection Processing by Access Monitoring/History Manager 46

Figure 10:
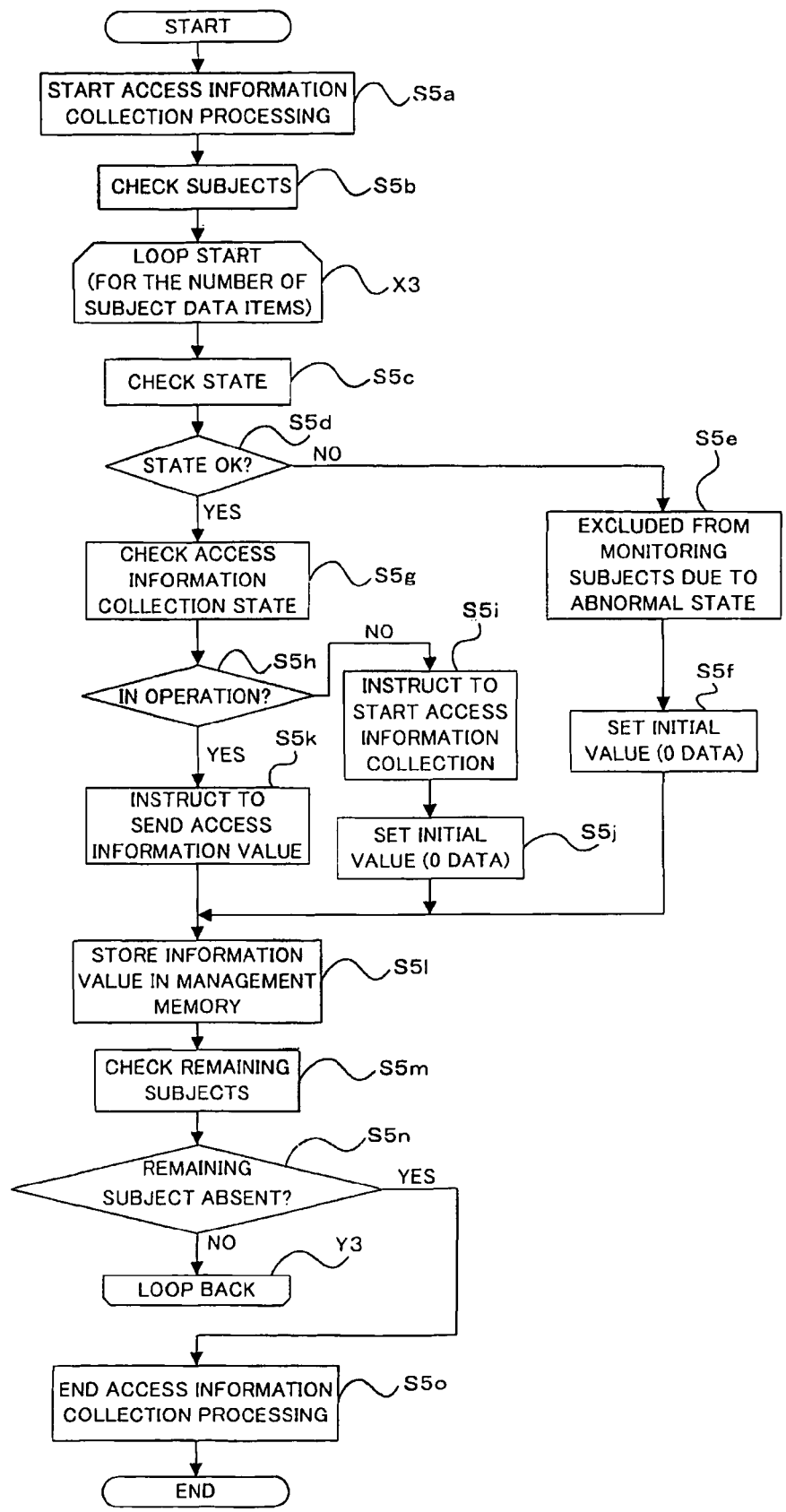
FIG. 10 is a flowchart indicating an example of procedures of access information collection processing performed by the access monitoring/history managing unit of the cache memory controller in the CM of the storage system according to one preferred embodiment of the present invention.

Next, referring to the flowchart (steps S5a through S5o, X3, and Y3) shown in FIG. 10, a detailed description will be made of access information collection processing (processing performed in the above described step S5 of FIG. 8) performed by the access monitoring/history manager 46.

First of all, when collection processing of access information by the access information collection controller 43 is started by the access monitoring/history manager 46 (step S5a), the access monitoring/history manager 46 checks (subject check) data whose access information is to be collected (step S5b).

In this instance, in FIG. 10, the block indicated by the reference character "X3" immediately below step S5b [described as "loop start (for the number of subject data items)"] and the block indicated by the reference character "Y3" (described as "loop back") show a fact that the processing in steps S5c through S5n between these blocks X3 and Y3 are executed for the number of subject data items. The processing in steps S5c through S5n are kept being performed until step S5n, which will be described later, determines that no data item is remained (until passing through YES route of step S5n).

Then, here, also, the access monitoring/history manager 46 performs a state check, checking whether or not the mounting state, the operation state, and the power state, of the DE 10 and the disks 11 relating to subject data are normal (step S5c). In this instance, this processing is for checking whether or not any disorder has occurred after a check result of a normal operation is obtained in the processing of the above described step S4.

Here, for example, when the access monitoring/history manager 46 decides that the state of apparatuses is abnormal [any disk 11 is discharged from a DE 10, or the operation state is in disorder, or the power is turned off] (NO route of step S5d), the access monitoring/history manager 46 decides that the data is excluded from the monitoring subjects due to such an abnormal state (step S5e), and sets an initial value (for example, "0") to the access information to the data (step S5f), and then shifts to the processing in step S5l described later.

Contrarily, when the access monitoring/history manager 46 decides that the states of the disks 11 and the DE 10 are normal (YES route of step S5d), it checks a collection state of access information about access from the access information collection controller 43 to the data (step S5g).

For example, the access information collection controller 43 checks whether or not reactivation processing, which is performed in a case where the disks 11 or the like is changed from a non-mounted state thereof to a mounted state thereof, and where any disorder state is recovered has been performed.

Here, the access information collection controller 43 is in an abnormal operation such as a restarting operation (NO route of step S5h), the access monitoring/history manager 46 instructs the access information collection controller 43 to start collection of access information once again (step S5i), and sets an initial value (for example, "0") to the access information to the data (step S5*j*), and then shifts to the processing in step S5*l*, which will be described later.

Contrarily, if the access information collection controller 43 is in a normal operation (YES route of step S5*h*), the access monitoring/history manager 46 gives the access information collection controller 43*a* transmission instruction of an access information value (the number of times of accesses) of the data (step S5*k*).

Subsequently, the access monitoring/history manager 46 stores a value obtained in any of the above steps S5*f*, S5*j*, and S5*k* in a management memory (for example, access history holding unit 52) as access information (information value) of the data (step S5*l*).

After that, the access monitoring/history manager 46 checks whether or not any subject data remains (remaining subject check) (step S5*m*). If the remaining subject data is present (NO route of step S5*n*), the access monitoring/history manager 46 loops back to the processing in the above described step S5*c* (see box Y3).

Contrarily, if the remaining subject data is absent (YES route of step S5*n*), the access monitoring/history manager 46 ends access information collection processing (step S5*o*), and the processing ends.

[c-3] Access Information History Management Processing by Access Monitoring/History Manager 46

Figure 8:
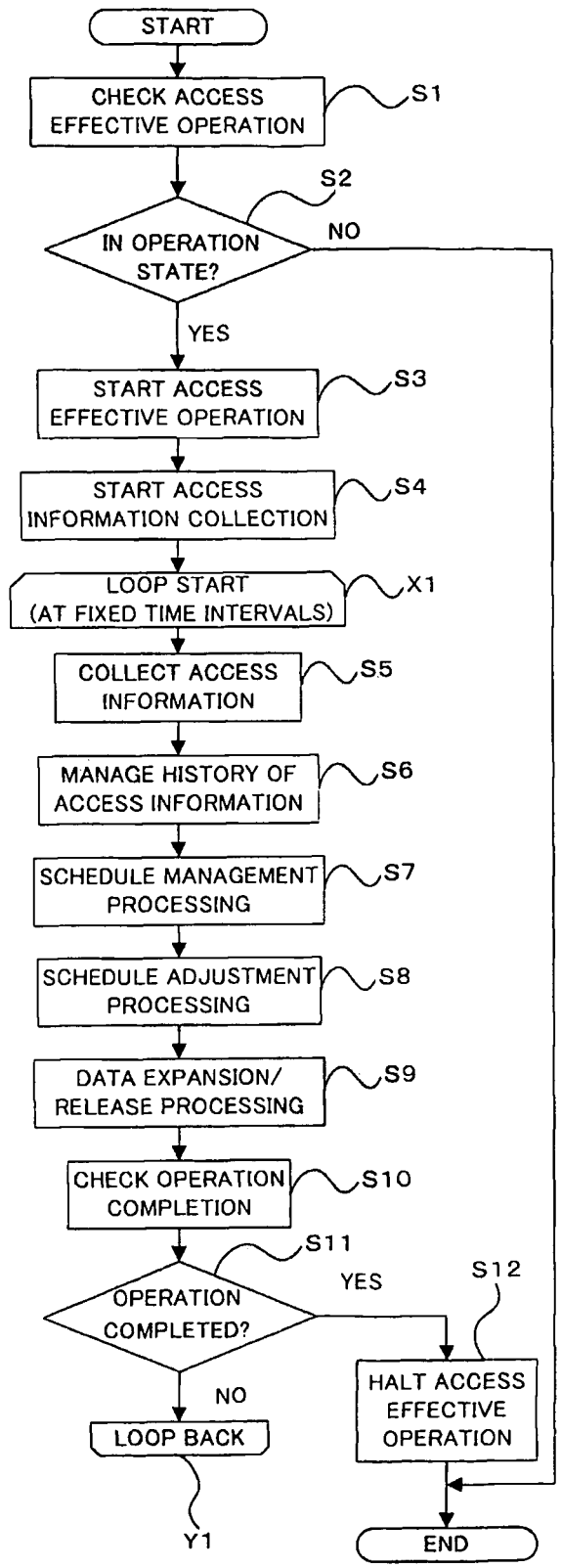
FIG. 8 is a flowchart for describing processing procedures of a memory controlling method according to one preferred embodiment of the present invention.
Figure 9:
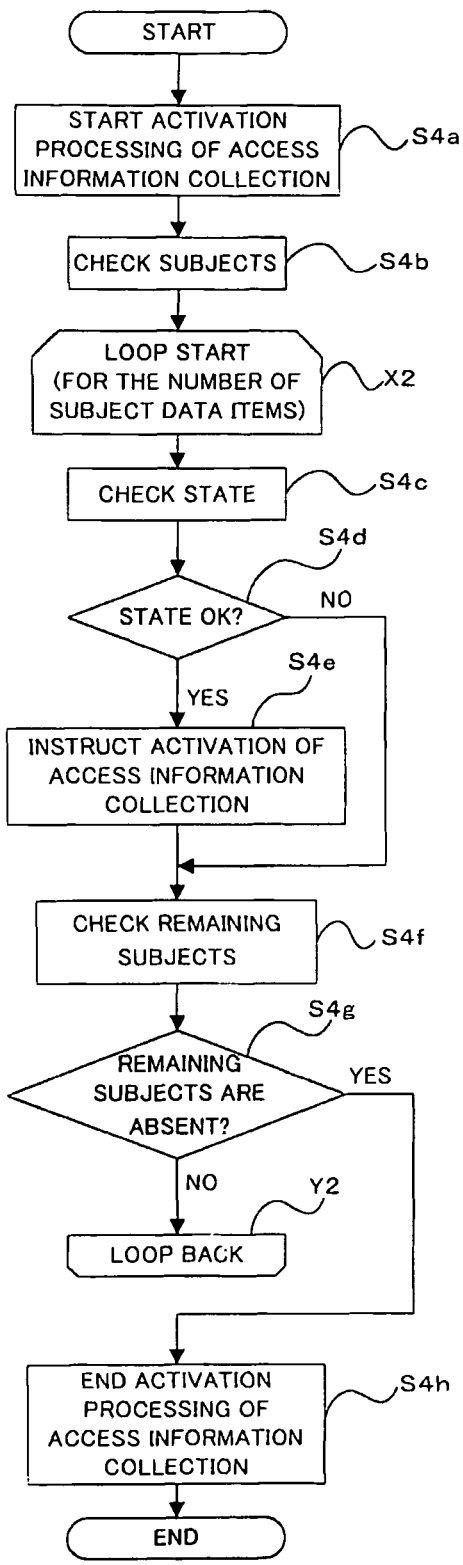
FIG. 9 is a flowchart indicating an example of procedures of access information collection activating processing performed by the access monitoring/history managing unit of the cache memory controller in the CM of the storage system according to one preferred embodiment of the present invention.
Figure 11:
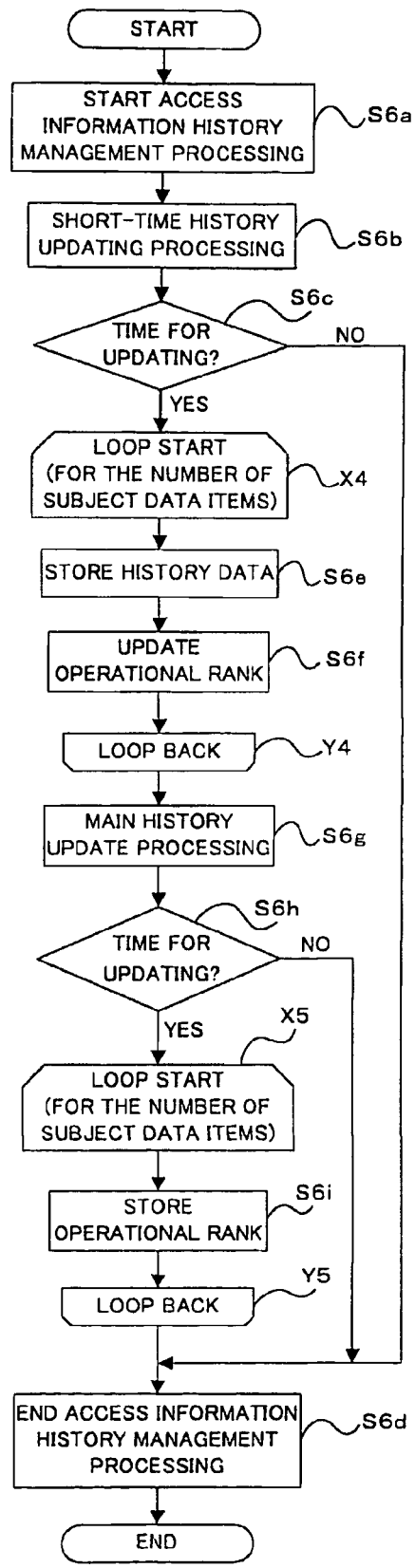
FIG. 11 is a flowchart indicating an example of processes of access information collection processing performed by the access monitoring/history managing unit of the cache memory controller in the CM of the storage system according to one preferred embodiment of the present invention.

Next, referring to the flowchart (steps S6*a* through S6*i*, X4, X5, Y4, and Y5) of FIG. 11, a detailed description of history management processing of access information performed by the access monitoring/history manager 46 (processing in step S6 in the above described FIG. 8).

After starting of access information history management processing (step S6*a*), the access monitoring/history manager 46 firstly starts short-time history updating processing (step S6*b*).

Here, the "short-time history updating processing" means processing which summarizes the access information collected by the access information collection controller 43 into history information in every predetermined time period (here, every time period of 30 minutes from 0o'clock) as an access state.

In the beginning, the access monitoring/history manager 46 evaluates whether or not it is a time at which updating is to be performed (step S6*c*). That is, the access monitoring/history manager 46 evaluates whether or not it is a time at which access information in every time period of 30 minutes from 0 o'clock is to be summarized, in other words, whether or not the access information for the time period of 30 minutes corresponding to the predetermined time period has been obtained.

Then, if deciding that it is not a time at which updating is to be performed (NO route of step S6*c*), the access monitoring/history manager 46 ends the access history management processing without performing any processing (step S6*d*).

Contrarily, if deciding it is a time at which updating is to be performed (YES route of step S6*c*), the access monitoring/history manager 46 shifts to processing performed in step S6*e* through S6*i*, which will be described later.

In FIG. 11, the block [described as "loop start (for the number of subject data items)"] indicated by the reference character "X4" immediately below step S6*c* and the block indicated by the reference character "Y4" (described as "sloop back") show that the access monitoring/history manager 46 executes the processing in steps S6*e* and S6*f* for the number of subject data items, After completion of processing in the steps S6*e* and S6*f* to all the subject data, the access monitoring/history manager 46 shifts to the processing in step S6*g*, which will be described later.

Next, the access monitoring/history manager 46 stores access information for 30 minutes for each subject data item as history data into a memory (for example, the access history holding unit 52) as history data (step S6*e*) Concretely, as shown in FIG. 4, the access monitoring/history manager 46 summarizes access information for 30 minutes into one information item for each data item.

Subsequently, the access monitoring/history manager 46 determines an access frequency (A through D; Operational Rank) in the time period based on the history data stored in the above step S6*e* and stores the determined access frequency in a memory (for example, the access history holding unit 52) (step S6*f*).

Then, after performing processing in the above steps S6*e* and S6*f* for the number of data items, the access monitoring/history manager 46 executes main history updating processing (step S6*g*).

Here, the "main history updating processing" means processing of summarizing history information in every time period of 30 minutes into information in every half a day for individual data items and managing the summarized history information as an access state (see FIG. 5).

In the beginning, the access monitoring/history manager 46 evaluates whether or not it is a time at which updating is to be performed (step S6*h*). That is, the access monitoring/history manager 46 evaluates whether or not it is a time at which access information for half a day is to be summarized, in other words, whether or not access information of every time period of 30 minutes for half a day has been obtained.

Then, if deciding that it is not a time at which updating is to be performed (NO route of step S6*h*), the access monitoring/history manager 46 ends the access information history management processing without performing any processing (step S6*d*).

Contrarily, if deciding that it is a time at which updating is to be performed (YES route of step S6*h*), the access monitoring/history manager 46 shifts to the processing in step S6*i*, which will be described later.

In this instance, the block [described as "loop start (for the number of subject data items)"] indicated by the reference character "X5" immediately below step S6*h* shows that the access monitoring/history manager 46 executes the processing in step S6*i* between these blocks X5 and Y5 for the number of subject data items. After completion of the processing in step S6*i* to all the subject data, the access monitoring/history manager 46 shifts to the processing in step S6*d*.

Then, as shown in FIG. 5, in step S6*i*, the access monitoring/history manager 46 creates an access state in which an access frequency or the like in every time period of 30 minutes for half a day for individual data items are summarized, and stores the created access state in a memory (for example, the access history holding unit 52).

After completion of this processing to all the subject data, the access monitoring/history manager 46 ends the access information history management processing (step S6*d*).

[c-4] Schedule Management Processing by Schedule Managing/Updating Unit 47

Next, referring to the flowchart (steps S7*a* through S7*p*, X6 through X9, and Y6 through Y9) of FIG. 12, a detailed description will be made of schedule management processing performed by the schedule managing/updating unit 47 (processing in step S7 in the above described FIG. 8).

Concretely, this scheduling management processing performed by the schedule managing/updating unit 47 is processing of creating/updating such schedule information as shown in FIG. 6.

After starting the schedule management processing (step S7a), the schedule managing/updating unit 47 firstly executes schedule (history/preexistence) check processing (step S7b).

The schedule check processing (step S7b) means processing of confirming and updating the current schedule created from the existing history information (access state).

In the beginning, the schedule managing/updating unit 47 evaluates whether or not it is a time at which updating or restoring of schedule information is to be performed (step S7c). If deciding that it is not a time at which updating or the like is to be performed (NO route of step S7c), the processing in steps S7d through S7k, which will be described later, is skipped.

Contrarily, if deciding it is a time at which updating or the like is to be performed (YES route of step S7c), the schedule managing/updating unit 47 checks whether or not it is necessary to perform restoring processing of the current schedule information (step S7d). The evaluation of whether or not the restoring processing is necessary is performed by the schedule managing/updating unit 47 by means of checking that CM 31 or the like are reset or in a initiation state and evaluating whether or not the history or the schedule information is absent.

Then, if deciding that restoring processing is unnecessary (NO route of step S7e), the schedule managing/updating unit 47 skips the processing in steps S7f and S7g, which will be described later.

Contrarily, if deciding that the restoring processing is necessary (YES route of step S7e), the schedule managing/updating unit 47 performs the processing in steps S7f and S7g for the number of subject data items for time units (30-minute intervals) for half a day.

Figure 12:
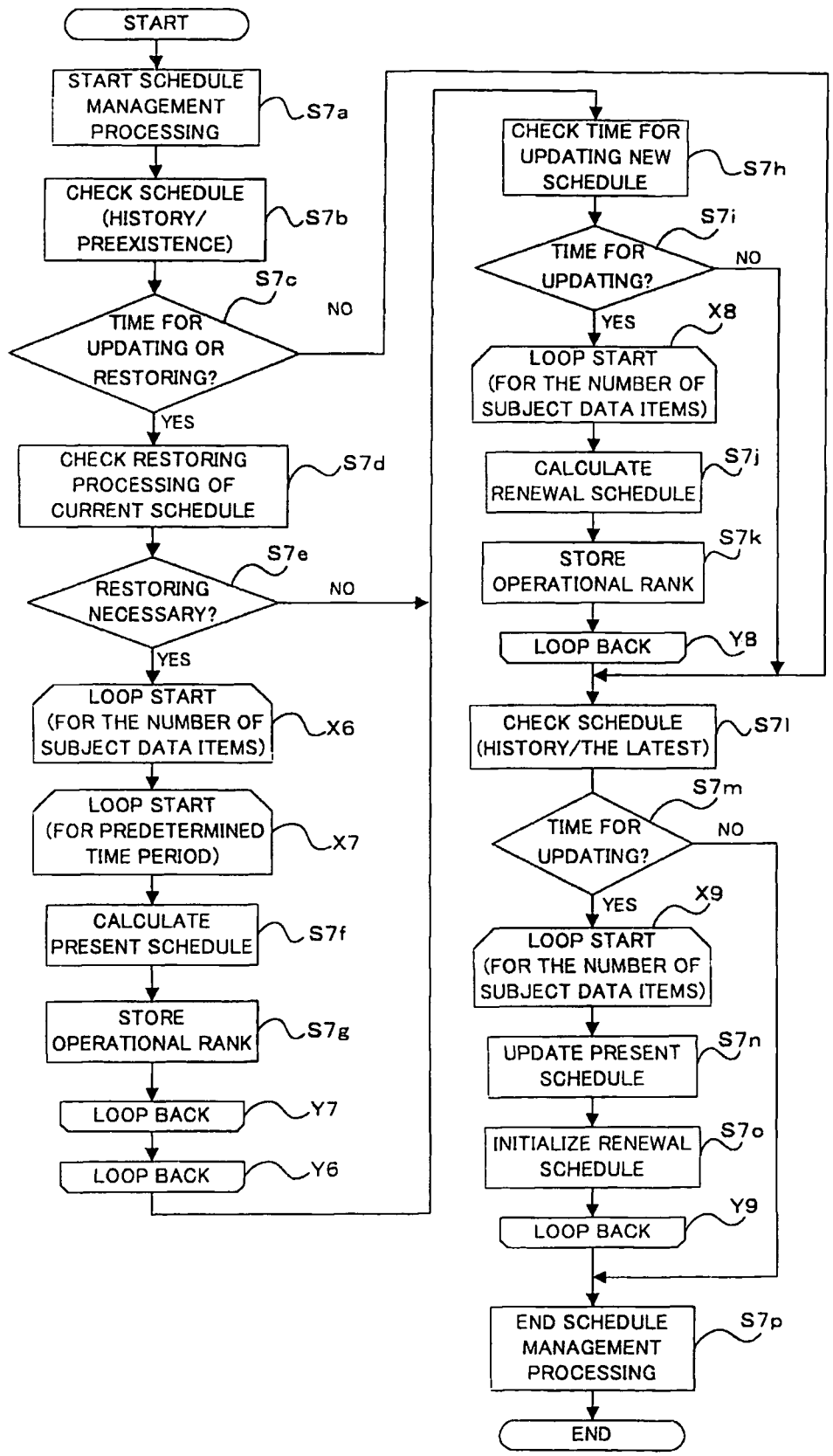
FIG. 12 is a flowchart indicating an example of processes of schedule management processing performed by the access schedule managing/updating unit of the cache memory controller in the CM of the storage system according to one preferred embodiment of the present invention.

Here, in FIG. 12, the boxes X6 and Y6 indicate that processing between these boxes are performed for the number of subject data items; boxes X7 and Y7 indicate that processing between these boxes are performed for time units (30 minutes) of half a day.

Then, as the restoring processing, the schedule managing/updating unit 47 calculates an access frequency (Operational Rank) as "Present" schedule shown in the above FIG. 6 based on history information, held in the access history holding unit 52, other than that on the present day (step S7f).

Concretely, the schedule managing/updating unit 47 calculates an access state in the past for a predetermined time unit shown in the above FIG. 6, based on history in the past other than that of the present day. This processing will be detailed with reference to FIG. 13 whose description will be made later.

Then, the schedule managing/updating unit 47 stores the access state calculated in the above step S7f in a memory (for example, the schedule holding unit 53) (step S7g).

Subsequently, the schedule managing/updating unit 47 performs check processing of whether or not it is a time at which updating of new schedule information (that is, the access state in the "Renewal" column in FIG. 6) is to be performed (step S7h).

Here, if deciding that it is not a time at which updating of the new schedule is to be performed (NO route of step S7i), the schedule managing/updating unit 47 skips the processing in steps S7j and S7k, which will be described later.

Contrarily, if deciding that it is a time at which updating is to be performed (YES route of step S7i), the schedule managing/updating unit 47 executes updating schedule calculation processing (step S7j) which creates schedule information for updating for the number of subject data items.

Here, in FIG. 12, the boxes X8 and Y8 indicate that processing (steps S7j and S7k) between these boxes are performed for the number of subject data items.

In this instance, the schedule managing/updating unit 47 calculates an access frequency (Operational Rank) as the schedule for updating based on all the history information held in the access history holding unit 52, that is, access history obtained by combining history information in the past and history information of the present day. That is, the schedule managing/updating unit 47 updates the access frequency using the history of the present day. This processing will be detailed with reference to FIG. 13 which will be described later.

Then, the schedule managing/updating unit 47 stores the calculated access frequency in the pertinent time period in the "Renewal" column in the above FIG. 6 (step S7k).

Subsequently, the schedule managing/updating unit 47 performs schedule (history/the latest) check processing of updating the schedule information into the latest information, that is, checking whether or not the access frequency in the "Renewal" column is to be updated into the "Today" column (step S7l).

Here, if deciding that it is not a time at which the updating is to be performed (NO route of step S7m), the schedule managing/updating unit 47 skips the processing in steps S7n and S7o.

Contrarily, if deciding that it is a time at which the updating is to be performed (YES route of step S7m), the schedule managing/updating unit 47 executes processing of updating the schedule information in "Today" into the access frequency in the "Renewal" column updated (stored) in the above step S7k (step S7n).

In this instance, in FIG. 12, the boxes X9 and Y9 indicate that processing (steps S7n and S7o) between these boxes are performed for the number of subject data items.

Subsequently, the schedule managing/updating unit 47 initializes the schedule in the "Renewal" column (step S7o).

Then, the schedule managing/updating unit 47 ends the schedule management processing after executing the processing in step S7n and S7o for the number of subject data items (step S7p).

Here, referring to the flowchart (steps S20 through S46) of FIG. 13, a detailed description will be made of calculation processing (that is, processing in the above step S7j) of updating schedule (the access frequency in the above "Renewal" column) performed by the schedule managing/updating unit 47.

After starting of schedule calculation processing (step S20), the schedule managing/updating unit 47 calculates updating schedule for the number of subject data items (step S21). That is, the schedule managing/updating unit 47 calculates an access frequency (A through D) as schedule for updating at predetermined time intervals (here, at every time period of 30 minutes from 0 o'clock) based on all the history information (schedule information in the past and schedule information of the present day).

Figure 13:
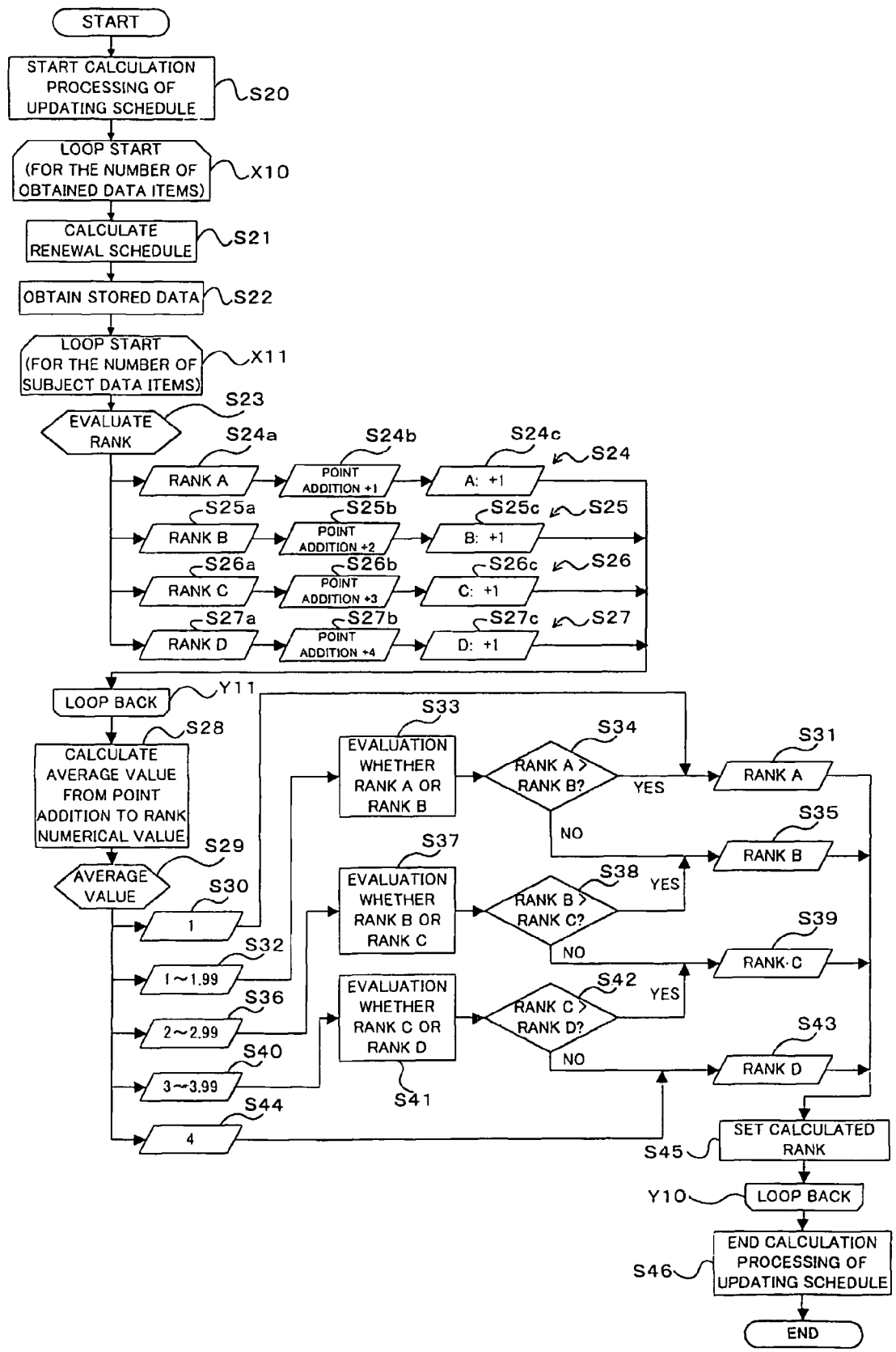
FIG. 13 is a flowchart indicating an example of processing processes of updating schedule calculation performed by the access schedule managing/updating unit of the cache memory controller in the CM of the storage system according to one preferred embodiment of the present invention.

In this instance, in FIG. 13, the boxes X10 and Y10 indicate that processing (steps S21 through S44) between these boxes are performed for the number of subject data items, and the boxes X11 and Y11 indicate that processing (steps S23 through S27) between these boxes are performed for the number of obtained data items.

Then, the schedule managing/updating unit 47 obtains all the history information (the stored data) (step S22), and performs the processing in steps S23 through S27 to the obtained data (schedule), and calculates the precedence for each predetermined time period.

In this instance, the schedule managing/updating unit 47 may obtain only a predetermined information, not all the history information, in step S22. For example, the schedule managing/updating unit 47 can obtain schedule information in the past in a time period during which updating schedule is to be created, out of all the history information.

Then, the schedule managing/updating unit 47 decides that an access frequency (described as "RANK" in the figure) with respect to the schedule information in the past obtained in the above step S22 (step S23).

Here, if the access frequency is A (step S24a), the schedule managing/updating unit 47 adds 1 to a rank numeral value (step S24b), and further, adds 1 to the number in rank A (step S24c).

That is, the schedule managing/updating unit 47 calculates and holds rank numeral values with respect to all the data obtained in the above step 322, and manages the number of data items of each rank, out of the obtained data.

Further, if the access frequency is B (step S25a), the schedule managing/updating unit 47 adds 2 to the rank numeral value (step S25b), and further, adds 1 to the number in rank B (step S25c).

Still further, if the access frequency is C (step S26a), the schedule managing/updating unit 47 adds 3 to the rank numeral value (step S26b), and further, adds 1 to the number in rank C (step S26c).

Yet further, if the access frequency is D (step S27a), the schedule managing/updating unit 47 adds 4 to the rank numeral value (step S27b), and further, adds 1 to the number in rank D (step S27c).

In this instance, in FIG. 13, step S24a through S24c are indicated as step S24; step S25a through S25c are indicated as step S25; step S26a through S26c are indicated as step S26; and step S27a through S27c are indicated as step S27.

Then, when the processing in steps S24 through S27 is completed to all the obtained data, the schedule managing/updating unit 47 calculates an average value of the calculated rank numeral numbers (step S28). That is, the schedule managing/updating unit 47 calculates the average value by means of dividing the calculated rank numeral values by the number of obtained data items.

Subsequently, the schedule managing/updating unit 47 decides which one of the multiple numeral value ranges having been set beforehand the calculated average value belongs to (step S29).

Here, when the average value is 1 (step S30), the schedule managing/updating unit 47 decides that the access frequency to the data is A (step S31).

Further, if the average value is within a range of 1 through 1.99 (step S32), the schedule managing/updating unit 47 performs evaluation processing of evaluating whether the access frequency to the data is A or B (step S33).

Here, the schedule managing/updating unit 47 decides the access frequency based on the number of ranks summarized in the above steps S24c through S27c.

More precisely, the schedule managing/updating unit 47 compares the number of rank As and the number of weights performed to the numbers of rank Bs through rank Ds (step S34; expressed as "RANK A>RANK B?" in the figure). If the number of rank As is larger (YES route of step S34), the schedule managing/updating unit 47 decides that the access frequency to the data is A (step S31). Contrarily, if the number of rank As is smaller (NO route of step S34), the schedule managing/updating unit 47 decides that the access frequency to the data is B (step S35).

At that time, in step S34, the schedule managing/updating unit 47 evaluates whether or not the following formula (1) can hold with the weighting factor to the numbers of rank As and rank Bs being "1", the weighting factor to the number of rank Cs being "1.25", and the weighting factor to the number of rank Ds being "1.5".

$$\text{The number of rank } As > \text{the number of rank } Bs + \text{the number of rank } Cs \times 1.25 + \text{the number of rank } Ds \times 1.5 \quad (1)$$

Further, if the average value is within a range of 2 through 2.99;(step S36), the schedule managing/updating unit 47 performs evaluation processing to evaluate whether the access frequency to the data is B or C (step S37).

More precisely, the schedule managing/updating unit 47 compares the number of weights performed to the numbers of rank As and rank Bs with the number of weights performed to rank Cs and rank Ds (step S38; expressed as "RANK B>RANK C?" in the figure). If the number of rank As and rank Bs is larger (YES route of step S38), the schedule managing/updating unit 47 decides that the access frequency to the data is B (step S35). Contrarily, if the number of rank As and rank Bs is smaller (NO route of step S38), the schedule managing/updating unit 47 decides that the access frequency to the data is C (step S39).

At that time, in step S38, the schedule managing/updating unit 47 evaluates whether or not the following formula (2) can hold, with the weighting factor to the numbers of rank As and rank Ds being "1.25" and with the weighting factor to the number of rank Bs and rank Cs being "1".

$$\text{The number of rank } As \times 1.25 + \text{the number of rank } Bs > \text{the number of rank } Cs + \text{the number of rank } Ds \times 1.25 \quad (2)$$

Further, if the average value is within a range of 3 through 3.99 (step S40), the schedule managing/updating unit 47 performs evaluation processing to evaluate whether the access frequency to the data is C or D (step S41).

More precisely, the schedule managing/updating unit 47 compares the number of weights performed to the numbers of rank As through rank Cs (step S42; expressed as "RANK C>RANK D?" in the figure). If the number of rank As through rank Cs is larger (YES route of step S42), the schedule managing/updating unit 47 decides that the access frequency to the data is C (step S39). Contrarily, if the number of rank As through rank Cs is smaller (NO route of step S40), the schedule managing/updating unit 47 decides that the access frequency to the data is D (step S43).

At that time, in step S42, the schedule managing/updating unit 47 evaluates whether or not the following formula (3) can hold, with the weighting factor to the number of rank As being "1.5", with the weighting factor to the number of rank Bs being "1.25", and with the weighting factor to the number of rank Cs and Ds being "1".

$$\text{The number of rank } As \times 1.5 + \text{the number of rank } Bs \times 1.25 + \text{the number of rank } Cs > \text{the number of rank } Ds \quad (3)$$

Further, if the average value is "4", the schedule managing/updating unit 47 decides that the access frequency to the data is D (step S43).

Then, the schedule managing/updating unit 47 sets (or holds) these calculated ranks as schedule information (step S45).

The schedule managing/updating unit 47 executes processing in the above described steps S21 through S45 for the number of subject data items (see blocks X10 and Y10), and ends the updating schedule calculation processing (step S46).

In this manner, at the time of calculating schedule information for updating based on schedule in the past (history information), the schedule managing/updating unit 47 calculates the updating schedule based on the calculated value obtained by performing weighting to the numbers of ranks, not only by simply using the average value of the numeral number uniquely given to the schedule ranks in the past. It is thus possible to set accurate precedence (calculate updating schedule) to the data in line with an access tendency in the past. This makes it possible to use the cache memory 36 further efficiently.

That is, in comparison with ranking based on an average value of the rank numeral number based on history information in the past, since the schedule managing/updating unit 47 performs evaluation, giving weights to the number (frequency) of ranks which is poles apart from the rank, in order to perform correction in accordance with the frequency, it is possible to perform ranking in which past results to the data are reflected more accurately.

In this instance, the processing shown in the flowchart (steps S20 through S46) of FIG. 13 becomes the processing in the above step S7f and also that in step S81 in FIG. 14, which will be described later, depending upon the contents of subject data (data obtained in the above step S22).

In other words, the processing in these steps S7j, S7f, and S81 is realized by an identical algorithm shown in FIG. 13.

More precisely, the processing in the above step S7j is what has already been described, but in the processing in the above step S7f, the processing in step S22 is performed to history information in the past other than the history information of the present day in the access history holding unit 52. Further, in the processing in step S81 in FIG. 14, which will be described later, the processing in step S22 is performed to schedule information set by a user or schedule information in the past.

[c-5] Schedule Adjustment Processing by Schedule Managing/Updating Unit 47

Next, referring to the flowchart (steps S8a through S8p, X12 through X16, and Y12 through Y16) of FIG. 14, a detailed description will be made of schedule adjustment processing performed by the schedule managing/updating unit 47 (processing in step S8 in the above described FIG. 8).

Figure 14:
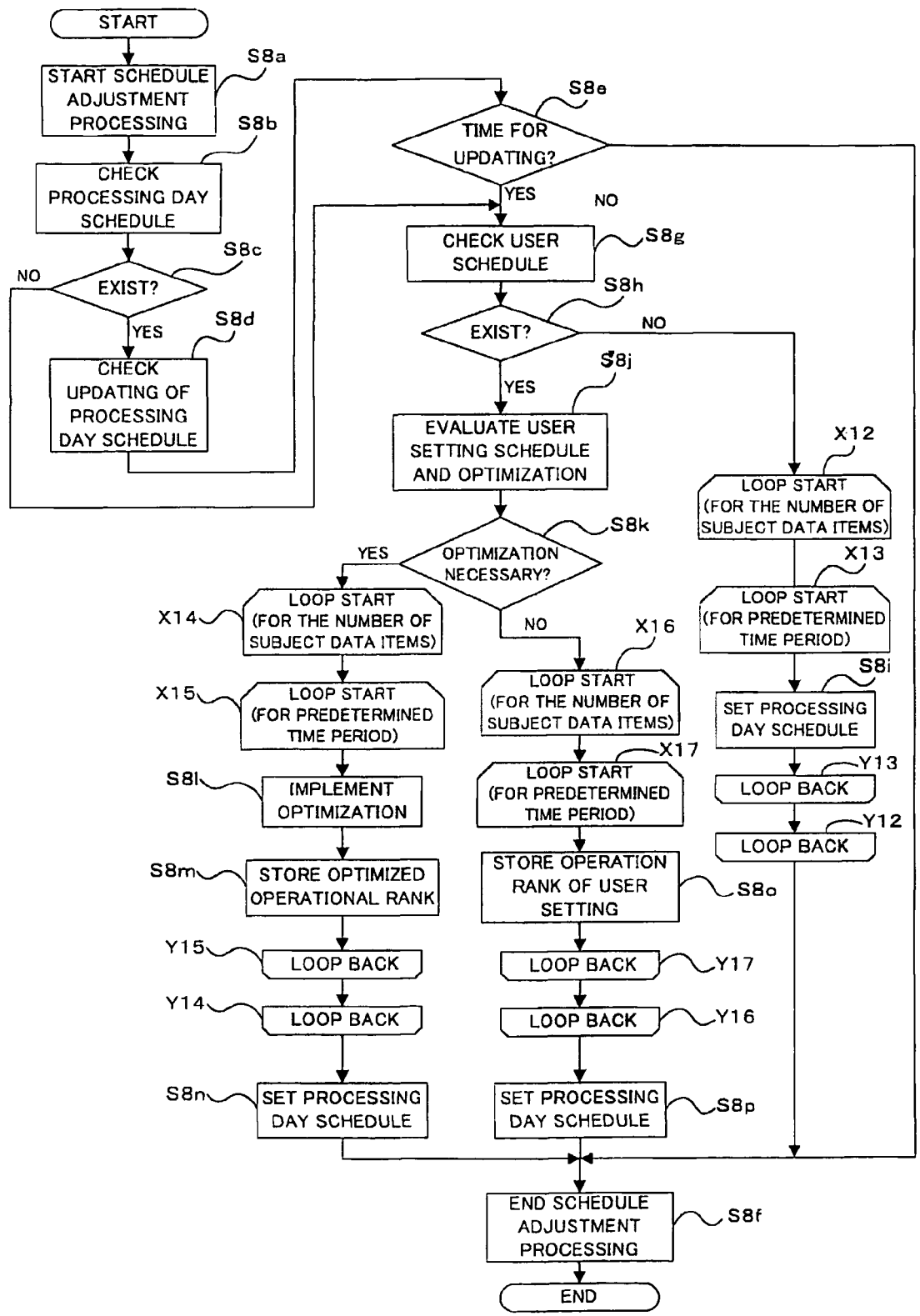
FIG. 14 is a flowchart indicating an example of processes of schedule adjustment processing performed by the access schedule managing/updating unit of the cache memory controller in the CM of the storage system according to one preferred embodiment of the present invention.

In this instance, if, for example, such a schedule as shown in FIG. 15 set by a user exists, the schedule adjustment processing shown in FIG. 14 adjusts the schedule information created in step S7 of the above described FIG. 8 in consideration of such a schedule.

That is, in the present storage system 1, it is possible for a user to set schedule information (see FIG. 15) determining the contents stored in the cache memory 36 in the CPUs 37 and 38 (schedule holding unit 53) through an interface (not illustrated).

After starting schedule adjustment processing (step S8a), the schedule managing/updating unit 47 firstly performs checking (processing day schedule check) of the presence or the absence of schedule information (schedule information in the above "Today" column; hereinafter will be also called "processing day schedule") for the day on which processing is performed (step S8b).

Then, if such a processing day schedule is not present (NO route of step S8c), the schedule managing/updating unit 47 skips the processing in steps S8d and S8e, which will be described later.

Contrarily, if the processing day schedule is present (YES route of step S8c), the schedule managing/updating unit 47 checks whether or not it is an update time at which processing day schedule is to be updated (step S8d).

As a result, when it is not an update time (NO route of step S8e), the schedule managing/updating unit 47 ends the schedule adjustment processing (step S8f).

Contrarily, when it is an update time (YES route of step S8e), the schedule managing/updating unit 47 checks the presence or the absence of user setting schedule (see FIG. 15) set by a user (step S8g).

Then, if such a user setting schedule is not present (NO route of step S8h), the schedule managing/updating unit 47 sets the processing day schedule (schedule for updating), as it is, to the whole number of subject data items as the schedule of "Today" at every predetermined time period (at 30-minute unit intervals) in half a day (step S8i), and ends the schedule adjustment processing (step S8f).

Here, in FIG. 14, the boxes X12 and Y12, X14 and Y14, and X16 ad Y16 indicate that processing between these boxes are performed for the number of subject data items; boxes X13 and Y13, X15 and Y15, and X17 and Y17 indicate that processing between these boxes are performed for time units of half a day.

In this instance, at that time, if the above step S8c decided that the processing day schedule is not present, the schedule managing/updating unit 47 does not set any information in the schedule column of "Today", and a state with no information therein is maintained.

Contrarily, if user setting schedule is present (YES route of step S8h), the schedule managing/updating unit 47 evaluates whether or not optimization processing based on the user setting schedule is to be performed (step S8j).

When a user adjusts schedule information determining the contents of the cache memory 36 through an interface (not illustrated), the present storage system 1 is operable to set precedence information to the cache memory controller 45 of the CPUs 37 and 38, which precedence information indicates whether the schedule set by the user is given precedence (that is, the schedule set by the user, as it is, is taken as schedule information) or the schedule set by the user and/or the corresponding schedule in the past (history information) is given precedence (that is, whether or not optimization processing using the schedule set by the user and/or the corresponding schedule in the past is to be performed).

Hence, the schedule managing/updating unit 47 evaluates whether or not optimization processing needs to be performed based on the precedence information set by the user (step S8k).

Here, if deciding that the optimization processing is necessary to be performed (YES route of step S8k), the schedule managing/updating unit 47 implements optimization of processing day schedule based on the schedule set by the user (step S81).

At that time, the schedule managing/updating unit 47 executes the optimization processing, following the processing procedures (algorithm) shown in the above FIG. 13. Concretely, in step S22 of the above FIG. 13, the schedule managing/updating unit 47 obtains the processing day schedule and the schedule set by the user, and executes subsequent steps S23 through S45 to these processing day schedule and the schedule set by the user.

With this processing, the schedule managing/updating unit 47 performs matching of the processing day schedule and the schedule set by the user, thereby optimizing the processing day schedule, and temporarily stores the optimized schedule (that is, "Operational Rank") in a memory (for example, the schedule holding unit 53) (step S8m).

In this instance, the schedule managing/updating unit 47 executes processing in these steps S81 and S8m for all the time units (see boxes X15 and Y15, and further, for the number of subject data items (see boxes X14 and Y14).

After that, the schedule managing/updating unit 47 sets the optimized processing day schedule as the processing day schedule (step S8n), and ends the schedule adjustment processing (step S8f).

On the other hand, upon decision of unnecessity of optimization processing (NO route of step S8k), the schedule managing/updating unit 47 temporarily stores the schedule set by the user, as it is, in a memory (for example, the schedule holding unit 53) (step S8o).

In this instance, the schedule managing/updating unit 47 executes this processing in step S8o for all the time units (see boxes X17 and Y17, and further, for the number of subject data items (see boxes X16 and Y16).

Then, the schedule managing/updating unit 47 sets the schedule set by the user as the processing day schedule (step S8p), and ends the schedule adjustment processing (step S8f).

In this manner, in cases where the schedule set by a user is present and a user gives an instruction of optimization, the schedule managing/updating unit 47 performs matching of the processing day schedule (schedule information) created based on history information in the past and the schedule set by the user, thereby optimizing the processing day schedule, so that it is possible for the schedule managing/updating unit 47 to set processing day schedule meeting both of a user's intension and a past tendency. As a result, further efficient use of the cache memory 36 is realized.

Further, with setting by a user, since it is possible to change processing day schedule into the schedule set by the user, user convenience is also improved.

[c-6] Data Expansion/Release Processing by Data Expansion/Release Controller 49

Next, referring to the flowchart (steps S50 through S56) of FIG. 16, a detailed description will be made of data expansion/release processing performed by the data expansion/release controller 49 (processing in step S9 in the above described FIG. 8).

In this instance, the data expansion/release processing is performed by the data expansion/release controller 49 by means of expanding/releasing the data in the cache memory 36 based on the schedule information (see FIG. 7) which has been optimized by the schedule managing/updating unit 47 in step S8 of the above described FIG. 8 and received from the schedule controller 48.

First of all, after starting data expansion/release processing based on the schedule information (step S50), the data expansion/release controller 49 executes history information check processing (step S51), in which the immediately preceding access tendency (a recent processing state) held in the access history holding unit 52 is evaluated, before the schedule corrector 50 actually performs the data expansion/release processing to the cache memory 36.

Subsequently, at the expansion processing, the schedule corrector 50 corrects the schedule information based on the access tendency and performs control evaluation processing of the expansion processing which evaluates the data expansion control (step S52).

Further, at the releasing processing, the schedule corrector 50 corrects the schedule information based on the access tendency and performs control evaluation processing of the release processing which evaluates the data release control (step S53).

Then, after performing the data expansion processing (step S54) and further the data release processing (step S55), the data expansion/release controller 49 ends the data expansion/release processing (step S56).

[c-6-1] History Information Check Processing by Data Expansion/Release Controller 49

Here, referring to the flowchart (steps S60 through S106, X18, X19, Y18, and Y19) of FIG. 17, a detail description will be made of schedule information check processing performed by the schedule corrector 50 of the data expansion/release controller 49 (processing in step S51 in the above described FIG. 16).

After starting history information processing (step S60), the schedule corrector 50 of the data expansion/release controller 49 obtains access information (see, for example, the above described FIG. 4) of 1-minute intervals held in the access history holding unit 52 for a predetermined time period (here, a time period of 30 minutes) as immediately preceding short-time history information (step S61).

Then, the schedule corrector 50 performs the processing in steps S62 through S105, which will be described later, to all the subject data.

Then, the schedule corrector 50 performs processing in the steps S62 through S105, which will be described later, to all the subject data. In this instance, in FIG. 17, the boxes X18 and Y18 indicate that processing between these boxes is executed for the number of subject data items.

In the beginning, the schedule corrector 50 calculates the average value (hereinafter, will be called the "load average value") in every one minute of history information for the immediately preceding 30 minutes obtained in the above described step S61 (step S62).

Then, the schedule corrector 50 performs the processing in steps S63 through S76, which will be described later, to all the access information (that is, 30 items of history information) in every one minute. In this instance, in FIG. 17, the boxes X19 and Y19 indicate that processing between these boxes is executed for the number of subject data items.

First of all, the schedule corrector 50 performs obtained-time checking to access information in every one minute, for checking whether the access information is that of the first half of the time period of 30 minutes or that of the latter half of the 30-minute time period (step S63). In this instance, the schedule corrector 50 decides that access information in the latest 15-minute time period, which is closer to the current time, is a part of the first half part, and that the access information in the older 15-minute time period of the 30-minute time period is the latter half part.

Then, when deciding that the access information is obtained in the first half of the obtained-time ("the first half" route of step S64), the schedule corrector 50 checks a difference between a load average value and the number of times of accesses (actually measured value) to the access information (step S65).

As a result, if the actually measured value is larger than the average value ("upper" route of step S66), the schedule corrector 50 adds "1" to the first half high-load value (its initial value is "0"), which indicates a high-load (the access frequency increases) tendency in the first half part (step S67), and further adds a difference (absolute value) between the actually measured value calculated in the above step S65 and the average value to a first half high-load difference value (its initial value is "0"), which indicates a total value of high-load differences in the first half part (step S68).

Contrarily, if the actually measured value is smaller than the average value ("lower" route of step S66), the schedule corrector 50 adds "1" to the first half low-load value (its initial value is "0"), which indicates a low-load (the access frequency decreases) tendency (step S69) in the first half part, and further adds a difference (absolute value) between the measured value calculated in the above step S65 and the average value to a first half low-load difference value (its initial value is "0"), which indicates a total value of low-load differences in the first half part (step S70).

In this instance, if the actually measured value and the average value are equal, the schedule corrector 50 makes a decision of a high-load tendency (that is, "upper" route of step S66), and then performs processing in the above steps S67 and S68.

Then, the schedule corrector 50 executes processing (steps S71 through S76) similar to that (steps S65 through S70) which is performed to access information in the above described first half part also to access information in the latter half part.

That is, if deciding that the time at which the access information is obtained is the latter half (the "latter half" route of step S64), the schedule corrector 50 checks a difference between the load average value and a difference between the load average value and the actually measured access information value (step S71).

Then, if the actually measured value is smaller than the load average value ("lower" route of step S72), the schedule corrector 50 adds "1" to the latter half low-load value (its initial value is "0"), which indicates a low-load (the access frequency decreases) tendency (step S73) in the latter half part, and further adds a difference (absolute value) between the actually measured value calculated in the above step S71 and the average value to a latter half low-load difference value (its initial value is "0"), which indicates a total value of low-load differences in the latter half part (step S74).

Contrarily, if the actually measured value is larger than the average value ("upper" route of step S72), the schedule corrector 50 adds "1" to the latter half high-load value (its initial value is "0"), which indicates a high-load (the access frequency increases) tendency in the latter half part (step S75), and further adds a difference (absolute value) between the actually measured value calculated in the above step S71 and the average value to a latter half high-load difference value (its initial value is "0"), which indicates a total value of high-load differences in the latter half part (step S76)

Then, after executing the processing in the above step S63 through S76 to all the 1-minute units of access information in the immediately preceding time period of 30 minutes, the schedule corrector 50 performs check processing of load point addition for the first half part (step S77).

That is, the schedule corrector 50 compares the first half high-load value calculated in the above step S67 with the first half low-load value to evaluate whether the first half pat exhibits a high-load tendency or a low-load tendency (step S77).

Here, in a case where the difference between the first half high-load value and the latter half low-load value does not exceed ¼ (that is, here, 3.75, which is ¼ of 15 data items for a time period of 15 minute in the first half) of a sample, the schedule corrector 50 decides that the high-load and the low-load are approximately the same ("high-load≈low-load" route of step S78), and decides that a load change (an increasing/decreasing tendency) is absent in the first half part (step S79).

Further, when the first half high-load value is larger than the first half low-load value by not smaller than 4, the schedule corrector 50 decides that there is a possibility of high-load in the first half part ("high-load>>low-load" route of step S78), and performs first half high-load difference point addition comparison processing, which calculates a difference between the load average value and the average value of the first half high-load difference value [that is, a value obtained by dividing the first half high-load difference value by the number of samples which are decided as "upper" (high-load) in step S66] (step S80).

Then, in a case where the calculated difference is smaller than 5% to the average value ("smaller than 5%" route of step S81), the schedule corrector 50 decides that there is no change in the load in the first half part (step S79).

Contrarily, in a case where the calculated difference is not smaller than 5% to the average value ("not smaller than 5%" route of step S81), the schedule corrector 50 decides that the first half part exhibits a high-load tendency (increasing tendency; first half high-load) (step S82).

Further, if the first half low-load value is larger than the first half high-load value by not smaller than 4, the schedule corrector 50 decides that there is a possibility of low-load in the first half part ("high-load<<low-load" route of step S78), and performs first half high-load difference point addition comparison processing, which calculates a difference between the load average value and the average value of the first half low-load difference value (that is, a value obtained by dividing the first half low-load difference value by the number of samples which are decided as "lower" (low-load) in step S66 (step S83).

Then, in a case where the calculated difference is smaller than 5% to the average value ("smaller than 5%" route of step S84), the schedule corrector 50 decides that there is no change in the load in the first half part (step S79).

Contrarily, in a case where the calculated difference is not smaller than 5% to the average value ("not smaller than 5%" route of step S84), the schedule corrector 50 decides that the first half part exhibits a low-load tendency (decreasing tendency; first half low-load) (step S85).

Further, the schedule corrector 50 executes the processing similar to that which is performed to the first half part shown in the above steps S77 through S85 also to the latter half part.

In this instance, the processing in the above steps S77 through S85 and the processing in the steps S86 through S94 correspond to each other, and differ from each other only in that the subject data in each processing is a latter half low-load value, a latter half high-load value, a latter half low-load difference value, and a latter half high-load difference value.

Then, after deciding that the latter half part is in any of the no change in the latter half low-load (step S88), the latter half high-load (step S91), and the latter half low-load (step S94), the schedule corrector 50 executes processing for comparing the load tendency in the first half part (the first half load) with the load tendency in the latter half part (the latter half load) (step S95).

Concretely, the schedule corrector 50 firstly decides how the first half load has been decided based on the decision results in the above steps S79, S82, and S85 (step S96).

Here, when deciding that the load in the first half is high-load ("high-load" route of step S96), the schedule corrector 50 decides how the load in the latter half has been evaluated, based on the decision results obtained in the above steps S88, S91, and S94 (step S97).

Then, when deciding that the load in the latter half is inversely low-load ("low load" route of step S97), the schedule corrector 50 decides that the immediately preceding access tendency exhibits a large increasing tendency (an increase in high-load is large) (step S98).

On the other hand, if deciding that there is no change in the latter half load ("no change" route of step S97), the schedule corrector 50 decides that the immediately preceding access tendency exhibits a small increasing tendency (increase in high-load is small) (step S99).

Further, when deciding that also the load in the latter half is high-load ("high-load" route of step S97), the schedule corrector 50 decides that the immediately preceding access tendency exhibits no change in increasing/decreasing (no change in load) (step S100).

Still further, when deciding that there is no change in the first half load in the above step S96 ("no change" route of step S96), the schedule corrector 50 evaluates a tendency in the latter half load in the similar manner to that in the step S97 (step S101).

Here, if deciding that the load in the latter half is low-load ("low load" route of step S101), the schedule corrector 50 decides that the immediately preceding access tendency exhibits a small increasing tendency (an increase in high-load is small) (step S99).

On the other hand, when deciding that there is no change in the latter half load ("no change" rout of step S101), the schedule corrector 50 decides that the immediately preceding access tendency exhibits no change in increasing/decreasing (no change in the load) (step S100).

Further, when deciding that the load in the latter half is high-load ("high-load" route of step S101), the schedule corrector 50 decides that the immediately preceding access tendency exhibits a small decreasing tendency (the low-load is small) (step S102).

Still further, when deciding that the load in the first half is low-load ("low load" route of step S96), the schedule corrector 50 evaluates a tendency in the latter half load in the similar manner to that in the above step S97 (step S103).

Here, if deciding that the load in the latter half is low-load ("low load" route of step S103), the schedule corrector 50 decides that the immediately preceding access tendency exhibits no change in increasing/decreasing (no change in the load) (step S100).

On the other hand, when deciding that there is no change in the latter half load ("no change" route of step S103), the schedule corrector 50 decides that the immediately preceding access tendency exhibits a small increasing tendency (an increase in low-load is small) (step S102).

Further, when deciding that the load in the latter half is high-load ("high-load" route of step S103), the schedule corrector 50 decides that the immediately preceding access tendency exhibits a large decreasing tendency (decreasing in the load is large) (step S104).

Then, the schedule corrector 50 stores the above described load evaluation results in a memory (for example, the data list holding unit 54) (step S105).

The schedule corrector 50 executes the processing in the above described steps S63 through S105 to all the processing subject data (see boxes X18 and Y18), and then, ends the history information check processing (step S106).

In this manner, before performing the expansion/release processing based on schedule information, the schedule corrector 50 creates the schedule information and then evaluates the immediately preceding access tendency based on the immediately preceding access information (history) collected during a time period, from creation of the schedule information and the start of expansion/release processing.

In this instance, at that time, the schedule corrector 50 divides the access information for the predetermined immediately preceding time period into a first half part and a latter half part, and evaluates the increasing/decreasing tendency for each of these parts. After that, the schedule corrector 50 compares an increasing/decreasing tendency between the first half part and the latter half part, thereby deciding the immediately preceding access tendency, so that such decision can be performed accurately.

Further, upon deciding the increasing/decreasing tendency, the schedule corrector 50 makes a decision not only by comparing the access frequencies (the fist half high-load value, the first half low-load value, the latter half high-load value, and the latter half low-load value) to the low-load average value (steps S78 and S87) but also based on an actual difference value to the low-load average value (the first half high-load difference value, the first half low-load difference value, the latter half high-load difference value, and the latter half low-load difference value), so that it is possible to decide the immediately preceding access tendency more accurately.

At that time, further, since the schedule corrector 50 decides that there is no change in the load (steps S79 and S88) in a case where the average value of the difference values to the load average value is only smaller than 5% ("smaller than 5%" route of steps S81, S84, S90, S93), it is possible to evaluate the increasing/decreasing tendency more accurately by means of deciding that there is no change in the load when the actual difference value is hardly present, even when a decision of a high-load tendency or a low-load tendency can be made based on the load value.

[c-6-2] Expansion Processing Control Evaluation Processing by Data Expansion/Release Controller 49

Next, referring to the flowchart (steps S110a, S111 through S146, S147a through S152a, X19a, and Y19a) of FIG. 18, a detail description will be made of control evaluation processing (processing in step S52 in the above describe FIG. 16) of data expansion processing performed by the schedule corrector 50 of the data expansion/release controller 49.

After starting control evaluation processing of expansion processing (step S110a), the schedule corrector 50 firstly obtains processing day schedule (step S111).

Then, the schedule corrector 50 executes the processing in steps S112 through S146, S147a through S151a for the number of data items to be subjected to the processing (see the boxes X19a and Y19a).

The schedule corrector 50 confirms the precedence (Operational Rank) at the current time in the obtained processing day schedule (step S112).

That is, the schedule corrector 50 performs rank evaluation (described as "evaluate RANK" in the figure) (step S113), and sets a rank as a base value for data expansion control.

The schedule corrector 50 evaluates which of the ranks the obtained precedence belongs to: rank A (step S114) which means that the precedence is an expansion high-precedence mode (step S115); rank B (step S116) which means that the precedence is an expansion precedence mode (step S117); rank C (step S118) which means that the precedence is an expansion available mode (step S119); and rank D (step S120) which means that the precedence is an expansion suppression mode (step S121).

Figure 16:
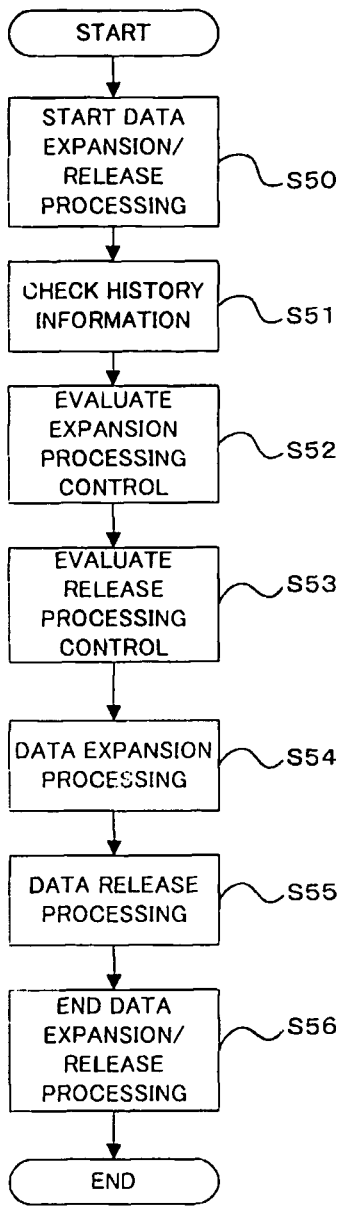
FIG. 16 is a flowchart indicating an example of procedures of data expansion/release processing performed by a data expansion/release controller of the cache memory controller in the CM of the storage system according to one preferred embodiment of the present invention.
Figure 17:
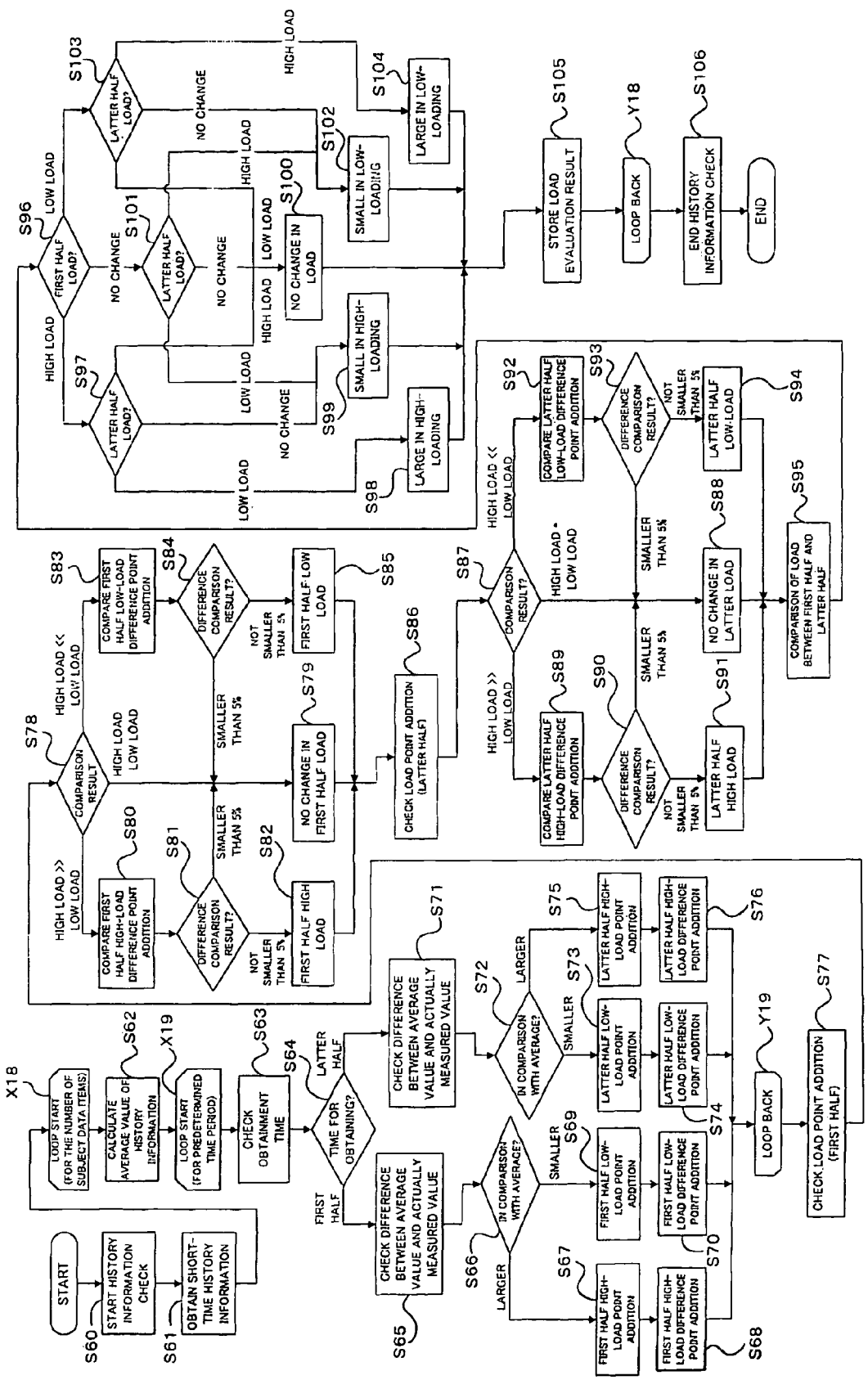
FIG. 17 is a flowchart indicating an example of procedures of history information check processing performed by a schedule collector of the data expansion/release controller of the cache memory controller in the CM of the storage system according to one preferred embodiment of the present invention.

Then, the schedule corrector 50 starts processing of determining a rank for actual data expansion control processing, as history information match processing, beginning from information indicating the access tendency (load tendency) obtained by means of the history information check processing (processing in step S51 in the above FIG. 16) detailed in the above described FIG. 17.

Concretely, the schedule corrector 50 checks the load tendency (a load evaluation result stored in step S105 of the above described FIG. 16) of the data (step S123).

Here, when the load tendency exhibits that a high-load tendency is large (step S124), the schedule corrector 50 calculates weight for collection based on the load tendency (step S125).

More precisely, when the load tendency exhibits that a high-load tendency is large (step S124), the schedule corrector 50 multiplies the weight reference value having been set beforehand (for example, "1") by 1.2, thereby calculating weight for correction (step S125).

When the load tendency exhibits that the high-load tendency is small (step S126), the schedule corrector 50 increases the preset weight reference value (for example, "1") by 1.1, thereby calculating weight for correction (step S127). When there is no change in the load (step S128), the schedule corrector 50 multiplies the weight reference value by 1.0, thereby calculating weight for correction (step S129). When the load tendency exhibits that the low-load tendency is small (step S130), the schedule corrector 50 multiplies the weight reference value by 0.9, thereby calculating weight for correction (step S131). When the load tendency exhibits that the low-load tendency is large (step S132), the schedule corrector 50 multiplies the weight reference value by 0.8, thereby calculating weight for correction (step S133).

Subsequently, the schedule corrector 50 reflects the first half high-load difference or the first half low-load difference, which is a difference result of the history information calculated in step S68 or in step S70 of the above described FIG. 17, to weight for correction (step S134).

Concretely, the schedule corrector 50 performs the calculation shown in the following formula (4).

$$\text{Weight for collection} + (\text{a difference result}/100) \qquad (4)$$

Here, in a case where the check result in the above step S123 exhibits that the high-load tendency is large (step S124) or the high-load tendency is small (step S126), the schedule corrector 50 adopts the first half high-load difference calculated in step S68 in the above described FIG. 17 as the value of a difference result of the above formula (4). At that time, the schedule corrector 50 uses the first half high-load difference, as it is, as a positive value, as a difference result.

Contrarily, in a case where the check result in the above step S123 exhibits that the low-load tendency is small (step S130) or the low-load tendency is large (step S132), the schedule corrector 50 adopts the first half low-load difference calculated in step S70 of the above described FIG. 17 as the value of a difference result of the above formula (4). At that time, the schedule corrector 50 uses the first half low-load difference as a negative value, as a difference result.

Further, in a case where the check result in the above step S123 exhibits no change (step S128) and the schedule corrector 50 uses "0" as a difference result value.

Subsequently, the schedule corrector 50 reflects the value of weight for correction to the load average value in the history information calculated in step S62 in the above described FIG. 17 (step S135).

Concretely, the schedule corrector 50 multiplies the load average value by the weight for collection subjected to the processing in the above described step S134.

Then, the schedule corrector 50 evaluates the result of reflection (step S136).

Here, when the refection result (that is, the processing result by the above described step S135) is not smaller than "10" (step S137), the schedule corrector 50 decides that the rank for correction of the subject data is A (step S138).

Further, when the refection result falls within a range of 2 through 9.99 (that is, not smaller than "2" and smaller than "10"; step S139), the schedule corrector 50 decides that the rank for correction of the subject data is B (step S140) When the refection result falls within a range of 0.5 through 1.99 (that is, not smaller than "0.5" and smaller than "2"; step S141), the schedule corrector 50 decides that the rank for correction of the subject data is C (step S142). When the refection result falls within a range of 0 through 0.49 (that is, not smaller than "0" and smaller than "0.5"; step S143), the schedule corrector 50 decides that the rank for correction of the subject data is D (step S144).

In this instance, these ranks A through D have the significance similar to the ranks as the precedence in the schedule information. Since the reflection result is an average value during a time period of 30 minutes (a value per minute), it is possible to perform ranking of the same significance based on the conditions of the above described steps S137, S139, S141, and S143).

Subsequently, the schedule corrector 50 stores the result value of the reflection result and the rank for correction in a memory (for example, data list holding unit 54)(step S145), and performs matching between the rank as a base value that is an evaluation result in the step S113 and the rank for correction (reflection result) (step S146).

Concretely, the schedule corrector 50 converts each of the rank as a base value and the rank for correction into a numeral number and calculates the average value thereof. Here, the schedule corrector 50 converts the rank as a base value and the rank for correction, taking rank A as "1", rank B as "2", rank C as "3", rank D as "4", and obtains the average between these two values.

Then, using the above obtained average value, the schedule corrector 50 starts data expansion precedence evaluation processing (step S147*a*).

First of all, the schedule corrector 50 evaluates whether or not data expansion in the cache memory 36 should be performed with precedence, based on data expansion precedence information indicating whether data expansion is to be performed with precedence or an normal operation is to be performed in control processing of the contents stored in the cache memory 36 (steps S148*a*).

That is, according to the present storage system 1, a user is capable of setting data expansion precedence information through an interface (not illustrated).

Then, when the data expansion precedence information indicates that data expansion should be performed with precedence (YES route of step S148*a*), the schedule corrector 50 performs processing of evaluating the final rank of the subject data, as data expansion precedence evaluation processing, based on a value which is obtained by omitting the residual of the average value calculated in the above described S146 (step S149*a*).

For example, when the average value is 1.5, the schedule corrector 50 omits 0.5 of the average value and copes with the average value as 1.0, and converts the average value into a rank using the value which is obtained by converting a rank into a number in the above described step S146.

Concretely, the schedule corrector 50 decides that the rank is A in a case where the average value is 1; rank B, in a case where the average value is 2; rank C, in a case where the average value is 3; rank D, in a case where the average value is 4.

In this manner, at the time data expansion is performed with precedence, the schedule corrector 50 omits the residual of the average value, thereby making the average value as small as possible to increase the final precedence of the data.

On the other hand, when the data expansion precedence information indicates that a normal operation should be performed (NO route of step S148*a*), the schedule corrector 50 evaluates processing of evaluating the final rank of the subject data, as normal operation precedence evaluation processing, based on a value obtained by carrying the residual of the average value calculated in the above described step S146 (step S150*a*).

For example, when the average value is 1.5, the schedule corrector 50 carries 0.5 of the average value and copes with the average value as 2.0, and converts the average value into a rank in a similar manner as that in the above step S149a.

In this manner, at the time of a normal operation with precedence, the schedule corrector 50 carries the residual of an average value, thereby coping with the average value in a usual manner to obtain the final precedence of the data.

Then, the schedule corrector 50 sets the rank decided in the above described step S149a or the above described step S150a as a rank (Operational Rank) for individual control which is the final rank (step S151a). For example, the schedule corrector 50 records the rank in the data list holding unit 54.

The schedule corrector 50 executes processing in the above described steps S112 through S146 and steps S147a through S151a for the number of subject data items (see boxes X19a and Y19a) and then ends the expansion processing control evaluation processing (step S152a).

In this manner, the schedule corrector 50 is capable of correcting the schedule information with reliability based on the immediately preceding access tendency in accordance with the access tendency before performing data expansion processing. That is, the schedule corrector 50 is capable of changing the schedule information dynamically based on the immediately preceding access tendency. Hence, even in a case where an access tendency changes after determination of schedule information, it is still possible to realize efficient use of the cache memory 36 by means of performing the data expansion processing based on the access tendency after correction thereof.

Figure 18:
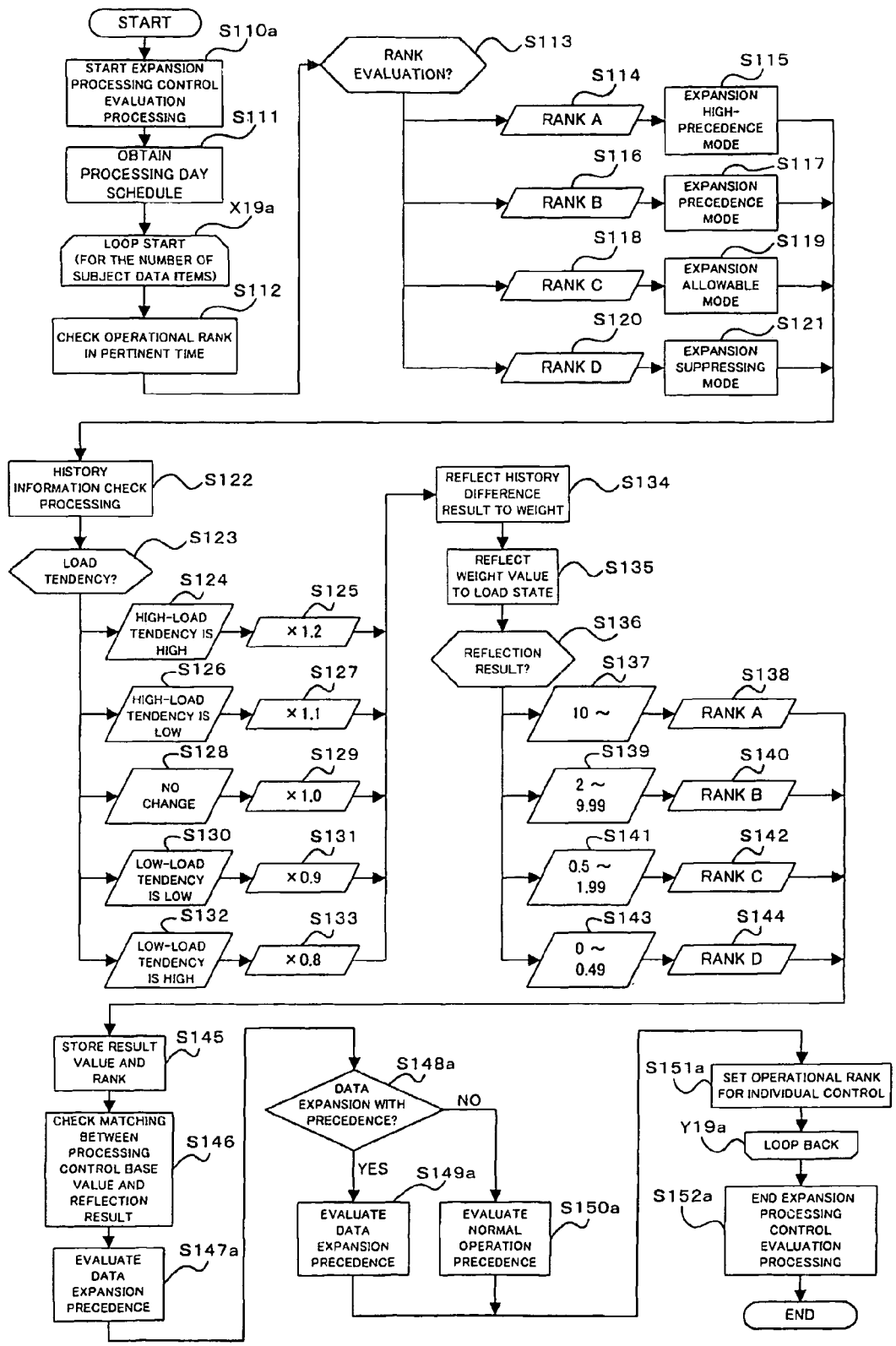
FIG. 18 is a flowchart indicating an example of procedures of control evaluation processing of expansion processing performed by the schedule corrector of the data expansion/release controller of the cache memory controller in the CM of the storage system according to one preferred embodiment of the present invention.

In this instance, all the numeral values used in each step in the above described FIG. 18 should by no means be limited to these in the present invention, and they can be varied in various ways without departing from the gist of the processing in the above described FIG. 18.

[c-6-3] Release Processing Control Evaluation Processing by Data Expansion/Release Controller 49

Next, referring to the flowchart (steps S110b, S111 through S146, S147b through S152b, X19b, and Y19b) of FIG. 19, a detail description will be made of control processing of release processing performed by the schedule corrector 50 of the data expansion/release controller 49 (processing in step S53 in the above describe FIG. 16).

Figure 19:
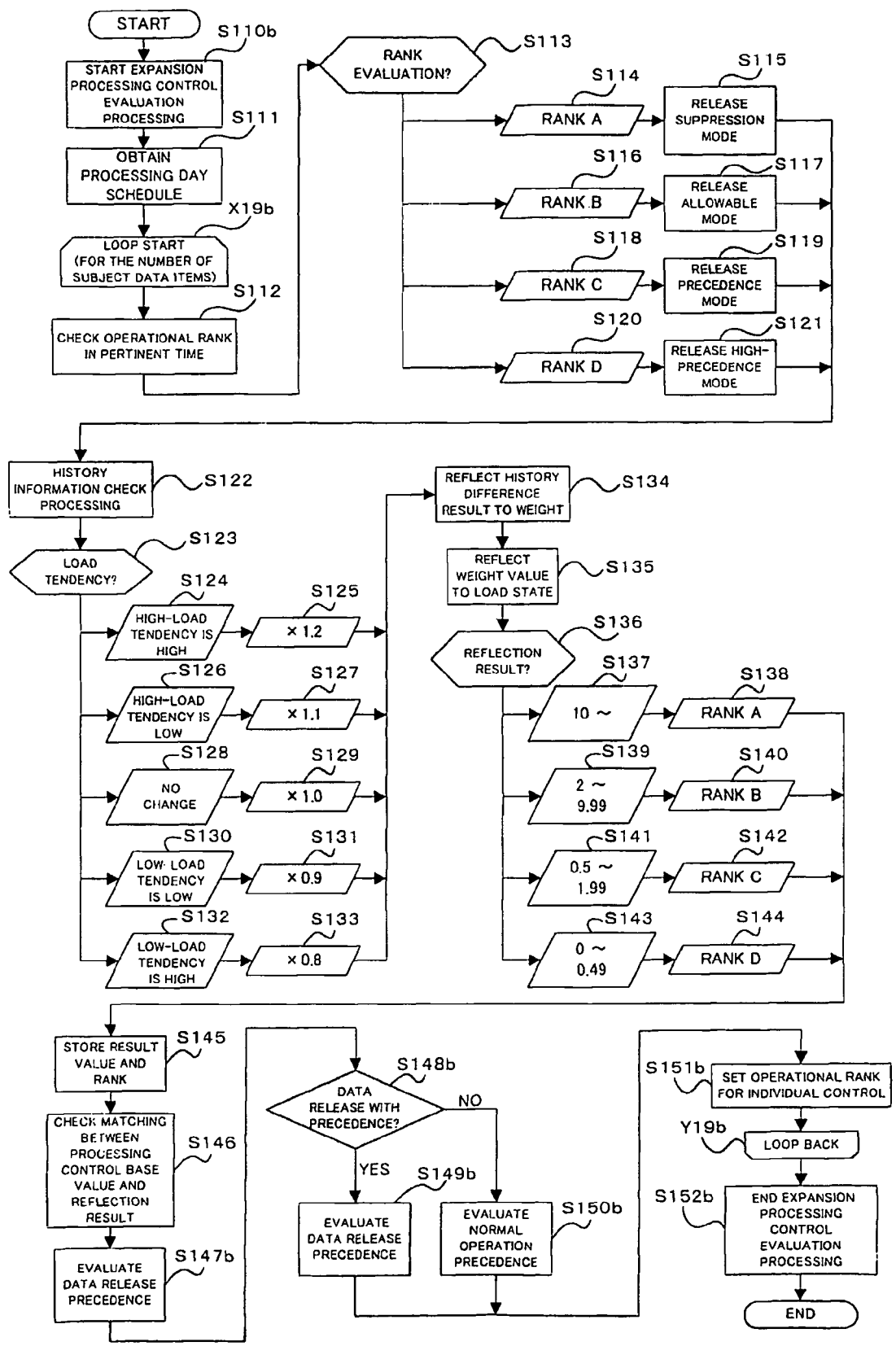
FIG. 19 is a flowchart indicating an example of procedures of control evaluation processing of release processing performed by the schedule corrector of the data expansion/release controller of the cache memory controller in the CM of the storage system according to one preferred embodiment of the present invention.

In this instance, in FIG. 19, the reference characters the same as those already described show processing the same or approximately the same processing.

That is, similar to the control evaluation processing of the expansion processing, after starting control evaluation processing of release processing (step S110b), the schedule corrector 50 obtains processing day schedule (step S111) and executes the processing in the above described steps S112 through 3146).

Then, the schedule corrector 50 starts data release precedence evaluation processing using the average value calculated in the above described step 3146 (step S147b).

First of all, the schedule corrector 50 evaluates whether or not the data release to the cache memory 36 is to be performed with precedence, based on data release precedence information indicating whether data release is to be performed with precedence or a normal operation is to be performed (step S148b).

That is, according to the present storage system 1, a user is capable of setting data release precedence information through an interface (not illustrated).

Then, when the data release precedence information indicates data release with precedence (YES route of step S148b), the schedule corrector 50 performs processing of evaluating the final rank of the subject data, as data release precedence evaluation processing, based on a value which is obtained by carrying the residual of the average value calculated in the above described S146 (step S149b)

For example, when the average value is 1.5, the schedule corrector 50 carries 0.5 of the average value, that is, performs "+1", and copes with the average value as 2.0, and converts the average value into a rank using the value which is obtained by converting a rank into a number in the above described step S146.

Concretely, the schedule corrector 50 evaluates that the rank is A in a case where the average value is 1; rank B, in a case where the average value is 2; rank C, in a case where the average value is 3; rank D, in a case where the average value is 4.

In this manner, at the time data release is performed with precedence, the schedule corrector 50 carries the residual of the average value, thereby making the average value as large as possible to decrease the final precedence of the data.

On the other hand, when the data release precedence information indicates a normal operation (NO route of step S148b), the schedule corrector 50 evaluates processing of evaluating the final rank of the subject data, as normal operation precedence evaluation processing, based on a value obtained by omitting the residual of the average value calculated in the above described step S146 (step S150b).

For example, when the average value is 1.5, the schedule corrector 50 omits 0.5 of the average value and copes with the average value as 1.0, and converts the average value into a rank in the similar manner as that in the above step S149b.

Then, the schedule corrector 50 sets the rank decided in the above described step S149b or the above described step S150b as a rank (Operational Rank) for individual controlling which is the final rank (step S151b). For example, the schedule corrector 50 records the rank in the data list holding unit 54.

The schedule corrector 50 executes processing in the above described steps S112 through S146 and steps S147b through S151b for the number of subject data items (see boxes X19b and Y19b) and then ends the release processing control evaluation processing (step S152b).

In this manner, the schedule corrector 50 is capable of correcting schedule information with reliability based on the immediately preceding access tendency in accordance with the access tendency before performing data release processing. That is, the schedule corrector 50 is capable of changing the schedule information dynamically based on the immediately preceding access tendency. Hence, even when an access tendency changes after determination of the schedule information, it is possible to realize efficient use of the cache memory 36 by means of performing data release processing based on the access tendency after correction thereof.

In this instance, all the numeral values used in each step in the above described FIG. 19 should by no means be limited to the present invention, and they can be varied in various ways without departing from the gist of the processing in the above described FIG. 19.

[c-6-4] Data Expansion Processing by Data Expansion/Release Controller 49

Figure 20:
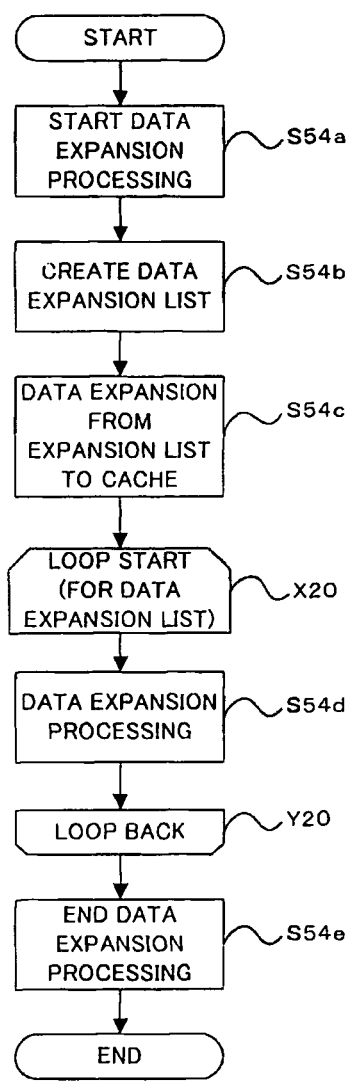
FIG. 20 is a flowchart indicating an example of procedures of data expansion processing performed by the data expansion/release controller of the cache memory controller in the CM of the storage system according to one preferred embodiment of the present invention.

Next, referring to the flowchart (steps S54a through S54e, X20, and Y20) of FIG. 20, a detail description will be made of data expansion processing performed by the data expansion/release controller 49 (processing in step S54 in the above described FIG. 16).

After starting data expansion processing (step S54a), the list creator 51 of the data expansion/release controller 49 firstly creates a data expansion list (step S54b).

As to the data expansion list creation processing by the list creator 51, its detailed description will be made with reference to FIG. 22, which will be described later. The list creator 51 checks the final rank, the current data expansion state in the cache memory 36, and apparatus construction information, as control evaluation processing results of the expansion processing shown in FIG. 18, and creates a data expansion list, as shown in FIG. 21, for example, formed by the data number for data expansion for every predetermined time period and precedence (rank).

Then, the data expansion/release controller 49 implements expansion processing to the cache memory 36 from the data expansion list (step S54c). More precisely, the data expansion/release controller 49 requests the IO controller 40 for prior reading of expansion subject data from the DE 10, thereby executing expansion of the data to the cache memory 36.

Here, the data expansion/release controller 49 performs expansion onto the cache memory 36 for the number of subject data items present in the list as shown in the boxes X20 and Y20 (step S54d), and then ends the data expansion processing (step S54e).

[c-6-5] Data Expansion List Creating Processing by List Creator 51

Here, referring to the flowchart (steps S160 through S185, X21 through X24, and Y21 through Y24) of FIG. 22, a detail description will be made of data expansion list creation processing performed by the data expansion/release controller 49 (processing in step S54b in the above described FIG. 20).

After starting data expansion list creating processing (step S160), the list creator 51 firstly reads the current expansion list, which is the list of the current data expanded in the cache memory 36 (step S161).

In this instance, the current data expansion list is, for example, information always managed by the cache memory controller 45.

Next, as data expansion list creation processing (step S162), the list creator 51 firstly evaluates whether or not the subject data is capable of being expanded in a space area of the cache memory 36 (step S163).

Figure 22:
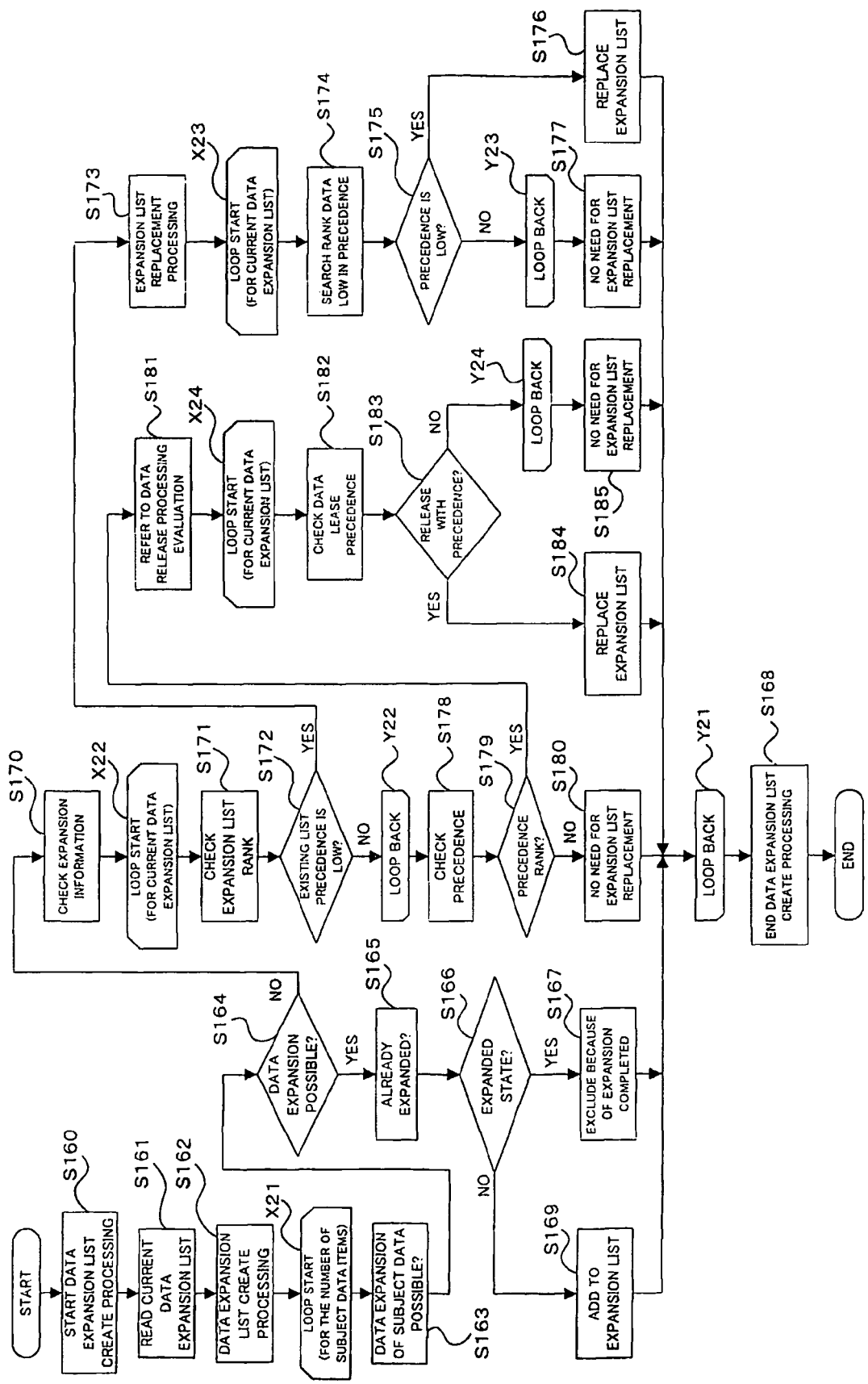
FIG. 22 is a diagram showing procedures of creating processing of the data expansion list performed by the data expansion/release controller of the cache memory controller in the CM of the storage system according to one preferred embodiment of the present invention.

In this instance, the boxes X21 and Y21 of FIG. 22 indicate that the processing therebetween, it is performed for the number of subject data items.

Then, when deciding that data expansion is available (YES rout of step S164), the list creator 51 evaluates whether or not the subject data has already been expanded onto the cache memory 36 (step S165).

Here, in a case where the subject data has already been expanded (YES route of step S166), the list creator 51 excludes the data from list creating subjects as the subjected data has already been expanded (step S167). In this instance, the processing keeps looping back to the box X21 (see box Y21) until the data expansion list creation processing is completed to all the subject data. After completion of the processing to all the subject data, the list creator 51 ends the expansion list creation processing (step S168).

Contrarily, in a case where the subject data has not yet been expanded (NO route of step S166), the list creator 51 adds the subject data to the expansion list (see FIG. 21) (step S169).

Further, when deciding that data expansion is incapable in the above step S164 (NO route of step S164), the list creator 51 performs expansion information check processing which compares the precedence of the data in the current data expansion list and that of the subject data (step S170).

More precisely, the list creator 51 compares the rank of the subject data with the rank of one of the data items in the current expansion list (expressed as "check expansion list RANK" in the figure; step S171). Here, when the precedence of the data in the current expansion list is lower (expressed as "existing list precedence is low?" in the figure; YES route of step S172), the list creator 51 performs expansion list replacement processing which replaces the one item of data with the subject data in the current data expansion list (or a copy of the list) (step S173).

Here, the list creator 51 performs processing of actually identifying data whose precedence is lower than that of the subject data (expressed as "search rank data low in precedence" in the figure) (step S174). At that time, the list creator 51 performs rank comparison with the subject data for every one of the data items in the current data expansion list.

Then, when the precedence of the data in the current expansion list is lower than that of the subject data (YES route of step S175), the list creator 51 replaces the data with the subject data in a new expansion list (step S176).

Contrarily, when the precedence of the data in the current expansion list is higher than that of the subject data (NO route of step S175), the list creator 51 performs the processing in the above steps S174 and S175 to the next data in the current expansion list.

Here, in FIG. 22, the boxes X23 and Y23 indicate that the list creator 51 performs the processing in the above step S174 and S175 for all the data items in the current expansion list as far as NO route is taken in the processing in the above step S175.

Then, in a case where no data whose precedence is lower than that of the subject data is present in the current data expansion list, as a result of executing the processing in the above steps S174 and S175 to all the data items in the current expansion list, the list creator 51 decides that it is unnecessary to replace the subject data to the new expansion list (step S177).

Further, in a case where the precedence of the data in the current expansion list is higher as a result of comparison between the rank of the subject data and that of one data item in the current expansion list (NO route of step S172), the list creator 51 performs the processing of the above steps S171 and S172 to the next data in the current expansion list.

Here, in FIG. 22, the boxes X22 and Y22 indicate that the list creator 51 keeps performing the processing in the above step S171 and S172 for all the data items in the current expansion list as far as NO route is taken in the processing in the above step S172.

Then, in a case where no data whose precedence is lower than that of the subject data is present in the current data expansion list, as a result of executing the processing in the above steps S171 and S172 to all the data items in the current expansion list, the list creator 51 performs precedence check that evaluates whether or not the subject data is to be expanded with precedence, for example, the list creator 51 evaluates whether or not the subject data belongs to rank A (step S178).

Here, when the subject data does not belong to the precedence rank (NO route of step S179), the list creator 51 decides that it is not necessary to replace the subject data to a new expansion list (step S180).

Contrarily, when the subject data belongs to the precedence rank (YES route of step S179), the list creator 51 performs the data release processing evaluation (see the above described FIG. 19) which decides a data item to be released from the current data in the cache memory 36 (step S181) and then performs data release precedence check that evaluates whether or not data belonging to rank D is present (step S182).

Here, in a case where data high in release precedence (data of rank D) is present (YES route of step S183), the list creator 51 replaces the data with the subject data in a new expansion list (step S184).

Further, in a case where the data in the current expansion list is not high in release precedence (NO route of step S183), the list creator 51 performs the processing in the above steps S182 and S183 to the next data in the current expansion list.

Here, in FIG. 22, the boxes X24 and Y24 indicate that the list creator 51 performs the processing in the above step S182 and S183 for all the data items in the current expansion list as far as NO route is taken in the processing in the above step S183.

Then, in a case where no data high in release precedence is present, as a result of performing the processing in steps S182 and S183 to all the data items in the current expansion list, the list creator 51 decides that it is unnecessary to replace the subject data to a new expansion list (step S185).

The list creator 51 executes the processing in the above described step S163 through step S185 for the number of subject data items (see the boxes X21 and Y21), and ends the data expansion list creation processing (step S168).

In this manner, since the list creator 51 creates a list of data to be expanded in the cache memory 36, based on the precedence information corrected by the schedule corrector 50 and the current expansion list indicating the current data in the cache memory 36, the data expansion/release controller 49 performs data expansion processing based on the list, thereby making it possible to execute data expansion processing with reliability in consideration to the current state of use of the cache memory 36. As a result, an efficient use of the cache memory 36 can be realized.

[c-6-6] Data Release Processing by Data Expansion/Release Controller 49

Figure 23:
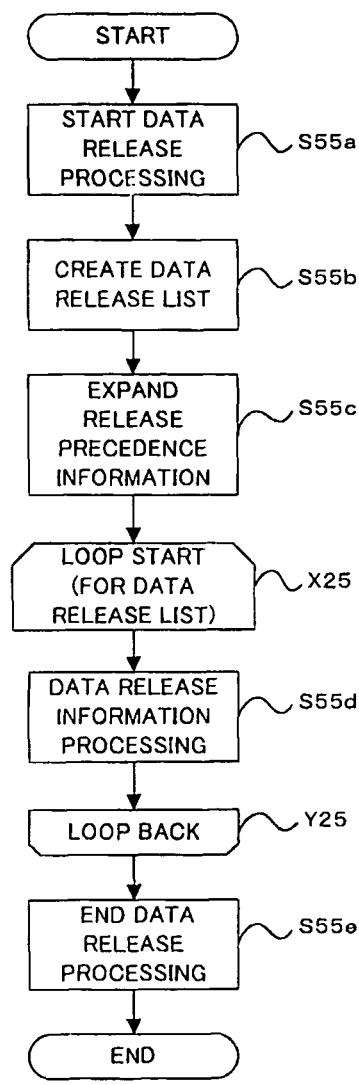
FIG. 23 is a flowchart indicating an example of procedures of data expansion processing performed by the data expansion/release controller of the cache memory controller in the CM of the storage system according to one preferred embodiment of the present invention.

Next, referring to the flowchart (steps S55a through S55e, X25, and Y25), of FIG. 23, a detail description will be made of release processing (processing in step S55 in the above described FIG. 16) performed by the data expansion/release controller 49.

After starting data release processing (step S55a), the list creator 51 of the data expansion/release controller 49 firstly creates a data release list (step S55b).

As to the data expansion list creation processing by the list creator 51, its detailed description will be made with reference to FIG. 25, which will be described later. The list creator 51 checks the final rank, the current data expansion state in the cache memory 36, and apparatus construction information, as a control evaluation processing result of release processing shown in FIG. 19, and creates a data release list, as shown in FIG. 24, for example, formed by the data number for data release for every predetermined time period and precedence (rank).

Then, the data expansion/release controller 49 implements release processing of an area used by the data from the cache memory 36, that is, removal processing of the data (step S55c), based on the created data release list. More precisely, the data expansion/release controller 49 sends, to the control unit of the cache memory 36, the information (release precedence information) of the data to be removed, based on the data release list, thereby executing release processing of the data in the cache memory 36.

Here, the data expansion/release controller 49 performs data release from the cache memory 36 for the number of subject data items present in the list as shown by the boxes X25 and Y25 (step S55d), and then ends the data release processing (step S55e).

[c-6-7] Data Release List Creation processing by List Creator 51

Here, referring to the flowchart (steps S190 through S201, X26, and Y26) of FIG. 25, a detail description will be made of data release list creation processing performed by the data expansion/release controller 49 (processing in step S55b in the above described FIG. 23).

After starting data release list creating processing (step S190), the list creator 51 firstly reads the current data expansion list, which is a list of the current data expanded on the cache memory 36 (step S191).

Next, as data release list creation processing (step S192), the list creator 51 evaluates whether or not one data item in the current data expansion list is capable of being released with high precedence (step S193).

Figure 25:
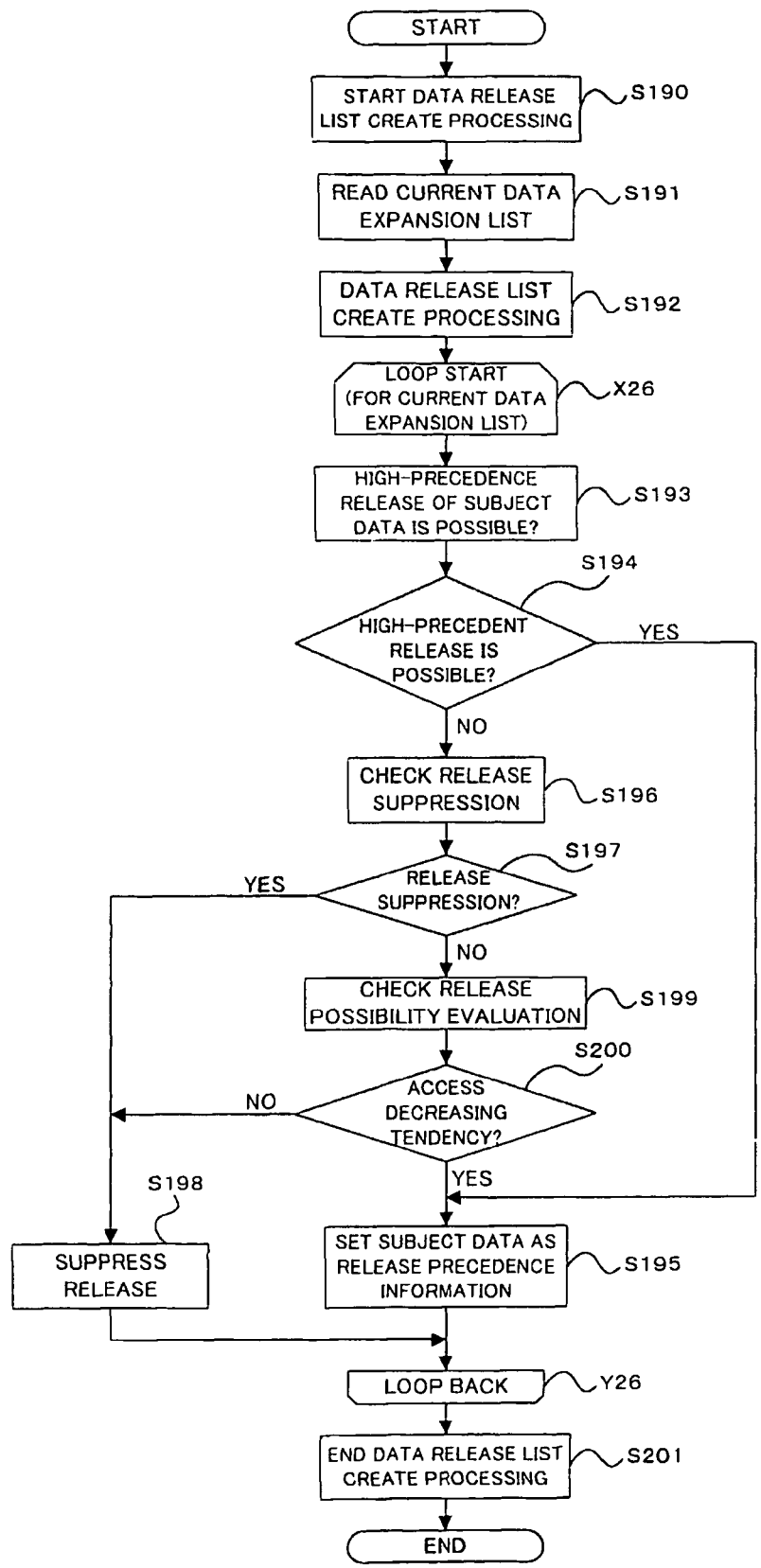
FIG. 25 is a diagram indicating procedures of data release list creation processing performed by the data expansion/release controller of the cache memory controller in the CM of the storage system according to one preferred embodiment of the present invention.
Figure 26:
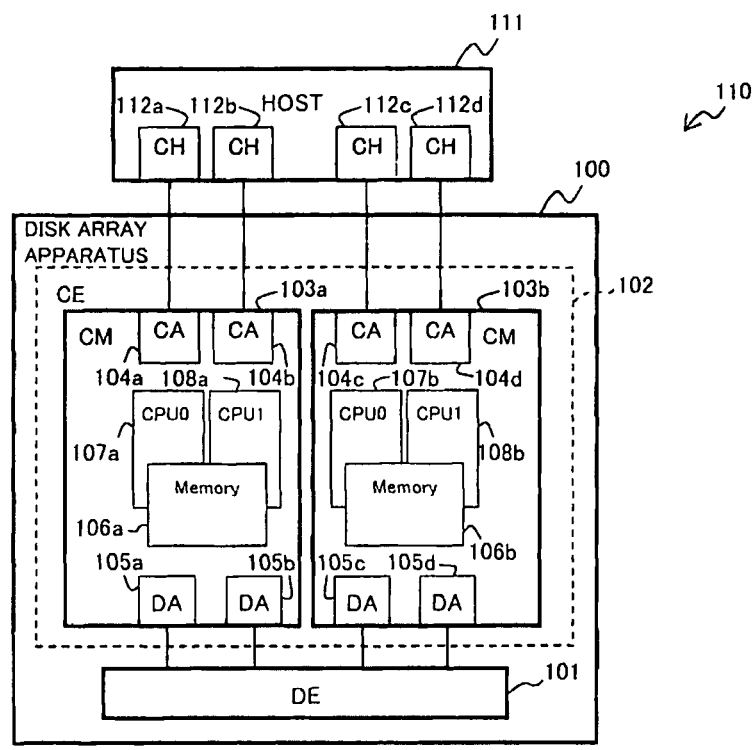
FIG. 26 is a block diagram showing a construction of a storage system including a previous disk array apparatus.

In this instance, in FIG. 25, the boxes X26 and Y26 indicate that the processing therebetween, it is executed for the number of subject data items in the current expansion list.

Concretely, the list creator 51 evaluates whether or not one data time in the current expansion list is capable of being released with high precedence, based on whether or not the precedence of the data is D (step S194).

Here, when deciding that data release with high precedence is available (YES rout of step S194), the list creator 51 sets the data as precedent release information, that is, adds the data to the data release list (step S195), and then performs the processing to the next data in the current expansion list.

Contrarily, when deciding that data release with high precedence is incapable (that is, when the precedence is not D, NO route of step S194), the list creator 51 performs release suppression check that checks whether or not the data is to be restrained from releasing thereof (step S196)

That is, the list creator 51 evaluates whether or not the data is to be restrained from releasing thereof, that is, it evaluates if the precedence is A, or if the precedence is the either of A or B (step S197).

Here, in a case where the data is to be restrained from releasing thereof (in a case where the precedence of the data is A or B) (YES route of step S197), the list creator 51 does not make the data included in the data release list, and suppress the release of the data (step S198).

Contrarily, in a case where the data is not to be restrained from releasing thereof (in a case where the precedence of the data is B or C) (NO route of step S197), the list creator 51 performs release capability evaluation check, that is, it evaluates whether or not the data is capable of being released (step S199).

More specifically, the list creator 51, for example, evaluates whether or not the access tendency of the data exhibits a decreasing tendency in comparison with the precedence in the previous predetermined time period (step S200). In a case of a decreasing tendency (YES route of step S200), the list creator 51 decides that the data is capable of being released and performs precedent release information set processing that adds the data to the data release list (step S195).

Contrarily, in a case where the data does not exhibit a decreasing tendency (NO route of step S200), the list creator 51 decides that the data is incapable of being released, and makes the data not included in the data release list, and suppresses the releasing of the data (step S198).

Then, the list creator 51 executes the processing in the above described steps S193 through S200 for the number of all subject data items (see boxes X26 and Y26), and ends the data release list creation processing (step S201).

In this manner, after data expansion processing performed by the data expansion/release controller 49, it is possible for the list creator 51 to make the data, which is present in the current expansion list and to be released (removed) from the list because of its low precedence, included in the data release list with reliability, based on the current data expansion list in the cache memory 36 in the state at that time and on the schedule information (precedence information).

In other words, the list creator 51 is capable of creating a data release list by the above described list creation processing in such a manner that the data not to be removed is left while the data which can be removed is positively removed, so that further efficient use of the cache memory 36 is realized.

[d] Effects and Benefits of Storage System 1 According to One Preferred Embodiment of the Present Invention In this manner, with the storage system 1 according to one preferred embodiment of the present invention, since the cache memory controller 45 of the CPUs 37 and 38 of the CM 31 includes: the access information collection controller 43 and the access monitoring/history manager 46 which monitor the state of access from the host 20 to the data stored in the DE 10; the schedule managing/updating unit 47 and the schedule controller 48 which create schedule information that determines contents to be stored in the cache memory 36 based on the access state; and the data expansion/release controller 49 which performs record processing of the data from the DE 10 to the cache memory 36 and removal processing of the data from the cache memory 36 based on the schedule information, it is possible to record data in line with the access state, to which data an access from the host 20 is expected, with reliability. Further, it is also possible to positively remove data in line with a state of access, from the cache memory 36, to which data no access from the host 20 is expected. Accordingly, allocation of the memory area, from which the prior data has been removed, to data high in access frequency or to data which is not included in the schedule information, is realized, so that response ability to the host 20 is further improved by using the cache memory 36 further efficiently.

In this instance, since the data expansion/release controller 49 executes the removal processing based on the schedule information after completion of the record processing based on the schedule information, the data expansion/release controller 49 further positively removes data from the cache memory 36, to which data no access from the host 20 is expected, from the cache memory 36, even when expansion of data, to which access is expected, in the cache memory 36 has already completed. As a result, further efficient use of the areas of the cache memory 36 is realized.

Further, partly since the schedule managing/updating unit 47 creates the precedence information indicating precedence with which the data to be recorded in the cache memory 36 is recorded in each predetermined time period as the schedule information for each of more than one data item stored in the DE 10, and partly since the data expansion/release controller 49 controls the record processing and the removal processing based on the precedence information, efficient use of the cache memory 36 is realized with reliability based on the access frequency, so that response ability to the host 20 is improved with reliability. That is, it is possible to provide a construction that realizes reading of data high in access probability with reliability under a state where the capacity of the cache memory 36 is limited.

Further, since the schedule managing/updating unit 47 creates the precedence information based on the access state and the schedule information having been set by a user beforehand, it is possible to control the cache memory 36 in a manner in which a user's intention is reflected, so that the convenience of a user is improved. Furthermore, in cases, for example, where there is data to which the host 20 is sure to access, the schedule managing/updating unit 47 is capable of reflecting that to controlling of the cache memory 36, which contributes to further efficient use of the cache memory 36.

Further, the data expansion/release controller 49 has the schedule corrector 50, which corrects the precedence information in accordance with the immediately preceding access state at the time of controlling of the record processing and the removal processing based on the precedence information, so that even if an access state is changed during a time duration between the time of creation of schedule information in accordance with the access state at that time and the time of actual start of the processing based on the schedule information, the data expansion/release controller 49 is still capable of controlling the contents stored in the cache memory 36 based on the precedence information supporting the change in the access state. This makes it possible to use the cache memory 36 more efficiently and to improve response ability to the host 20 with higher reliability.

At that time, the schedule corrector 50 corrects the precedence information based on an access increasing/decreasing tendency in a predetermined time period, as the immediately preceding access state, in such a manner that the precedence information of the data is heightened in a case of an access-increasing tendency while the precedence information of the data is lowered in a case of an access-decreasing tendency. This makes it possible to correct the precedence information into that which is in accordance with the immediately preceding access state, so that the above described effects and benefits are obtained with higher reliability.

Further, since the data expansion/release controller 49 controls the processing of data removal from the cache memory 36 based on the schedule information after being subjected to correction thereof by the schedule corrector 50, it is also possible to perform the removal processing in accordance with the immediately preceding access tendency to execution of the processing. This makes it possible to use the cache memory 36 further efficiently and to improve response ability to the host 20 with higher reliability.

[2] Other Modifications:

The present invention should by no means be limited to the above-illustrated embodiment, and various changes and modifications may be suggested without departing from the gist of the invention.

For example, in the above described embodiment, a description is made of an example in which the schedule managing/updating unit 47 performs the schedule adjustment processing (optimization) based on the schedule information set by a user (see FIG. 14). The present invention, however, should by no means be limited to this, and the schedule managing/updating unit 47 can perform the schedule adjustment processing based on the schedule in the past corresponding to the created schedule information.

That is, the schedule managing/updating unit 47 can create the precedence information based on an access state and the schedule information in the past.

Concretely, the processing shown in the above FIG. 14 can use the corresponding schedule in the past instead of using the user setting schedule. For example, as such a corresponding schedule in the past, the schedule managing/updating unit 47 performs optimization using the schedule of the same date in the past, that of the same day of the past week, or that of the same day of the past month.

With this arrangement, the schedule managing/updating unit 47 is capable of creating schedule information taking the history in the past into consideration, so that it is possible to efficiently reflect repetitive data or the like to the schedule information. As a result, it is possible to improve response ability to the host by using the cache memory 36 further efficiently.

Further, according to the above described embodiment, a description is made of an example in which the data expansion/release controller 49 executes the data removal processing in the cache memory 36 based on the precedence of the schedule information. The present invention, however, should by no means be limited to this. For example, the following construction can be provided in which the schedule managing/updating unit 47 creates the number of times of expected accesses in every predetermined time period for each of data items stored in the DE 10, and when the number of times of accesses to a data item reaches the expected number of times of accesses, the data expansion/release controller 49 removes the data item from the cache memory 36.

In this instance, although the specific method for calculating the expected number of accesses created by the data expansion/release controller 49 is not limited in the present invention, the data expansion/release controller 49 can determine the number of times of expected accesses as a value which is based on an average value of the access state used when the schedule information (precedence) is created, a value obtained by multiplying the average value by a predetermined rate (for example, approximately 1.1 through 1.5 times) as a safety ratio, or a value which is based on the corresponding history in the past (for example, the history of the same time and date in the past, that of the same day of the past month, or that of the same time and day of a past week.

Further, as concrete processing procedures of the expected number of times of accesses by the data expansion/release controller 49, for example, the processing by the data expansion/release controller 49 of evaluating whether or not the number of times of data accesses has reached the expected number, is added. When the evaluation result is positive, the data expansion/release controller 49 releases the data with precedence. Contrarily, when the evaluation result is negative, the processing proceeds to the procedure in step S196.

Further, as another example, the processing by the data expansion/release controller 49 of evaluating whether or not the number of times of data accesses has reached the expected number, is added. When the evaluation result is positive, the data expansion/release controller 49 releases the data with precedence. Contrarily, when the evaluation result is negative, the processing proceeds to the procedure in step S198. Furthermore, both of the above two procedures can be added.

With such an arrangement, the data expansion/release controller 49 is capable of removing the data, which has been expanded in the cache memory 36 based on the schedule information but no access to which data or the lower possibility of accessing thereto is considered, from the cache memory 36 at the time of such a decision being made. This makes it possible to further improve the speed and the efficiency of the release processing from the cache memory 36. As a result, further improvement in the response ability to the host 20 is realized.

Further, when performing control based on the number of times of expected accesses, the data expansion/release controller 49 can control the cache memory 36 to hold data, that is, not to remove the cache memory 36, in a case where the space capacity of the cache memory 36 is not smaller than a predetermined value, even when the number of times of accesses reaches the number of times of expected accesses. With this arrangement, it is possible to restrain the removal processing from being enforcedly performed even in cases where such removal processing is unnecessary, so that further efficient use of the cache memory 36 is realized.

In this instance, functions as the IO controller 40, the system controller 41, the apparatus monitoring controller 42, the access information collection controller 43, and the cache memory controller 45 [the access monitoring/history manager 46, the schedule managing/updating unit 47, the schedule control unit 48, the data expansion/release controller 49 (the schedule corrector 50 and the list creator 51)], can be realized by a computer (including a CPU, an information processing apparatus, and various types of terminals) which executes a predetermined application program (a memory control program).

The program is recorded in computer-readable recording media such as flexible discs, CDs (CD-ROMs, CD-Rs, and CD-RWs), and DVDs (DVD-ROMs, DVD-RAMs, DVD-Rs, DVD-RWs, DVD+Rs, and DVD+RWs). The computer reads the program from such recording media to transfer the program to an internal or external storage device, to store the programs therein. Alternatively, the programs can be recorded in storage devices (recording media) such as magnetic discs, optical discs, and magneto-optical discs, to be transferred to the computer over a communication network.

Here, the "computer" is defined as a concept including hardware and an OS (Operating System), or hardware operating under control of an OS. Further, in cases where hardware is capable of operating by itself without the necessity of an OS, the hardware is equivalent to the computer. The hardware includes at least a microprocessor such as a CPU and a means for reading computer programs recorded in the recording media.

The aforementioned predetermined application program as the above-mentioned memory control program contains program codes that instruct the computer to function as the IO controller 40, the system controller 41, and the apparatus monitoring controller 42, the access information collection controller 43, and the cache memory controller 45. Further, a part of those functions can be realized by an OS, not by such an application program.

Moreover, as recording media used in the embodiments of the present invention, not only the above-mentioned flexible discs, CDs, DVDs, magnetic discs, optical discs, and magneto-optical discs, but also various types of other computer-readable media, such as IC cards, ROM cartridges, magnetic tapes, punch cards, internal storage devices (memories such as RAMs and ROMs) of computers, external storage devices, and printed matter with any codes such as barcodes printed thereon, are also applicable.

What is claimed is:

1. A control apparatus, coupled to a storage apparatus comprising a storage medium for storing data therein and an upper apparatus for processing the data, for controlling read-processing of the data stored in the storage medium in the storage apparatus in response to a request from the upper apparatus, the control apparatus comprising:

a memory which stores the data read from the storage medium in the storage apparatus;

an access monitor which monitors a state of access from the upper apparatus to the data stored in the storage medium in the storage apparatus;

a schedule information generator which generates schedule information that determines contents to be stored in the memory based on the access state monitored by the access monitor; and a memory controller which controls recording of the data from the storage medium in the storage apparatus to the memory and deletion of the data from the memory based on the schedule information, the scheduling information generator generating, for each of the plurality of data items stored in the storage medium in the storage apparatus, the expected number of times of accesses in each predetermined time period, as the schedule information, and the memory controller deleting the data from the memory at the time the number of times of accesses to the data reaches the expected number of times of accesses if free space in the memory is smaller than a predetermined value.

2. The control apparatus as set forth in claim 1, the memory controller controlling the memory to hold the data therein even when the number of times of accesses to the data reaches the expected number of times of accesses in a if the free space in the memory is not smaller than the predetermined value.

3. A storage system, comprising:

at least one storage apparatus comprising a storage medium for storing data therein; and a control apparatus controlling read-processing of the data stored in the storage medium in the storage apparatus in response to a request from an upper apparatus for processing the data, the control apparatus including:

a memory which stores the data read from the storage medium in the storage apparatus;

an access monitor which monitors a state of access from the upper apparatus to the data stored in the storage medium in the storage apparatus;

a schedule information generator which generates schedule information that determines contents to be stored in the memory based on the access state monitored by the access monitor; and a memory controller which controls recording of the data from the storage medium in the storage apparatus to the memory and deletion of the data from the memory based on the schedule information, the scheduling information generator generating, for each of the plurality of data items stored in the storage medium in the storage apparatus, the expected number of times of accesses in each predetermined time period, as the schedule information, and the memory controller deleting the data from the memory at the time the number of times of accesses to the data reaches the expected number of times of accesses.

4. A memory controlling method for use in control of a memory, which stores the data read from a storage apparatus, of a control apparatus, coupled to the storage apparatus comprising a storage medium for storing data therein and an upper apparatus for processing the data, for controlling read-processing of the data stored in the storage medium in the storage apparatus in response to a request from the upper apparatus, the method comprising:

monitoring a state of access from the upper apparatus to the data stored in the storage medium in the storage apparatus;

generating schedule information that determines contents to be stored in the memory based on the access state monitored in the monitoring; and controlling recording of the data from the storage medium in the storage apparatus to the memory and deletion of the data from the memory based on the schedule information, wherein, in the generating, for each of a plurality of data items stored in the storage medium in the storage apparatus, the expected number of times of accesses in each predetermined time period is generated as the schedule information, and wherein, in the controlling, the data is deleted from the memory at the time the number of times of accesses to the data reaches the expected number of times of accesses.

* * * * *

UNITED STATES PATENT AND TRADEMARK OFFICE
CERTIFICATE OF CORRECTION

PATENT NO. : 9,053,056 B2
APPLICATION NO. : 12/199295
DATED : June 9, 2015
INVENTOR(S) : Masahiro Yoshida et al.

It is certified that error appears in the above-identified patent and that said Letters Patent is hereby corrected as shown below:

In the claims

Claim 2, Column 43, Line 16:

After "accesses" delete "in a".

Signed and Sealed this
Thirteenth Day of October, 2015

Michelle K. Lee
*Director of the United States Patent and Trademark Office*